United States Patent
Crego et al.

(10) Patent No.: US 11,932,242 B1
(45) Date of Patent: Mar. 19, 2024

(54) FLEET DASHCAM SYSTEM FOR AUTONOMOUS VEHICLE OPERATION

(71) Applicant: Zoox, Inc., Foster City, CA (US)

(72) Inventors: Andrew Scott Crego, Foster City, CA (US); Josh Alexander Jimenez, San Francisco, CA (US); James William Vaisey Philbin, Palo Alto, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 336 days.

(21) Appl. No.: 17/210,101

(22) Filed: Mar. 23, 2021

(51) Int. Cl.
*B60W 30/09* (2012.01)
*B60W 60/00* (2020.01)
*G06V 20/58* (2022.01)
*G08G 1/00* (2006.01)

(52) U.S. Cl.
CPC .......... *B60W 30/09* (2013.01); *B60W 60/001* (2020.02); *G06V 20/58* (2022.01); *G08G 1/20* (2013.01); *B60W 2420/403* (2013.01); *B60W 2420/52* (2013.01)

(58) Field of Classification Search
None
See application file for complete search history.

(56) References Cited

U.S. PATENT DOCUMENTS

| | | |
|---|---|---|
| 2019/0124290 A1 | 4/2019 | Yuan |
| 2020/0074024 A1 | 3/2020 | Levinson et al. |
| 2020/0200551 A1* | 6/2020 | Fischer ................. G07C 5/008 |
| 2021/0018916 A1 | 1/2021 | Thakur et al. |

OTHER PUBLICATIONS

Office Action for U.S. Appl. No. 17/210,126, dated Jan. 25, 2022, Crego, "Fleet Dashcam System for Event-Based Scenario Generation", 18 pages.

* cited by examiner

Primary Examiner — Alan D Hutchinson
(74) Attorney, Agent, or Firm — Lee & Hayes, P.C.

(57) ABSTRACT

Techniques for receiving and processing sensor data captured by a fleet of vehicle are discussed herein. In some examples, a fleet dashcam system can receive sensor data captured by electronic devices on a fleet of vehicles and can use that data to detect collision and near-collision events. The data of the collision or near-collision event can be used to determine a simulation scenario and a response of an autonomous vehicle control to the simulation scenario and/ or it can be used to create a collision heat map to aid in operation of an autonomous vehicle.

20 Claims, 10 Drawing Sheets

FLEET DASHCAM SYSTEM FOR AUTONOMOUS VEHICLE OPERATION

BACKGROUND

Vehicular and other transportation methods can be impaired due to various events, such as accidents and traffic. Autonomous vehicles use sensors and algorithms to respond to accidents and traffic in order to avoid collisions and safely travel from one location to another. The algorithms process data collected by the sensors to recognize hazards or potential hazards and direct the autonomous vehicle to respond accordingly.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
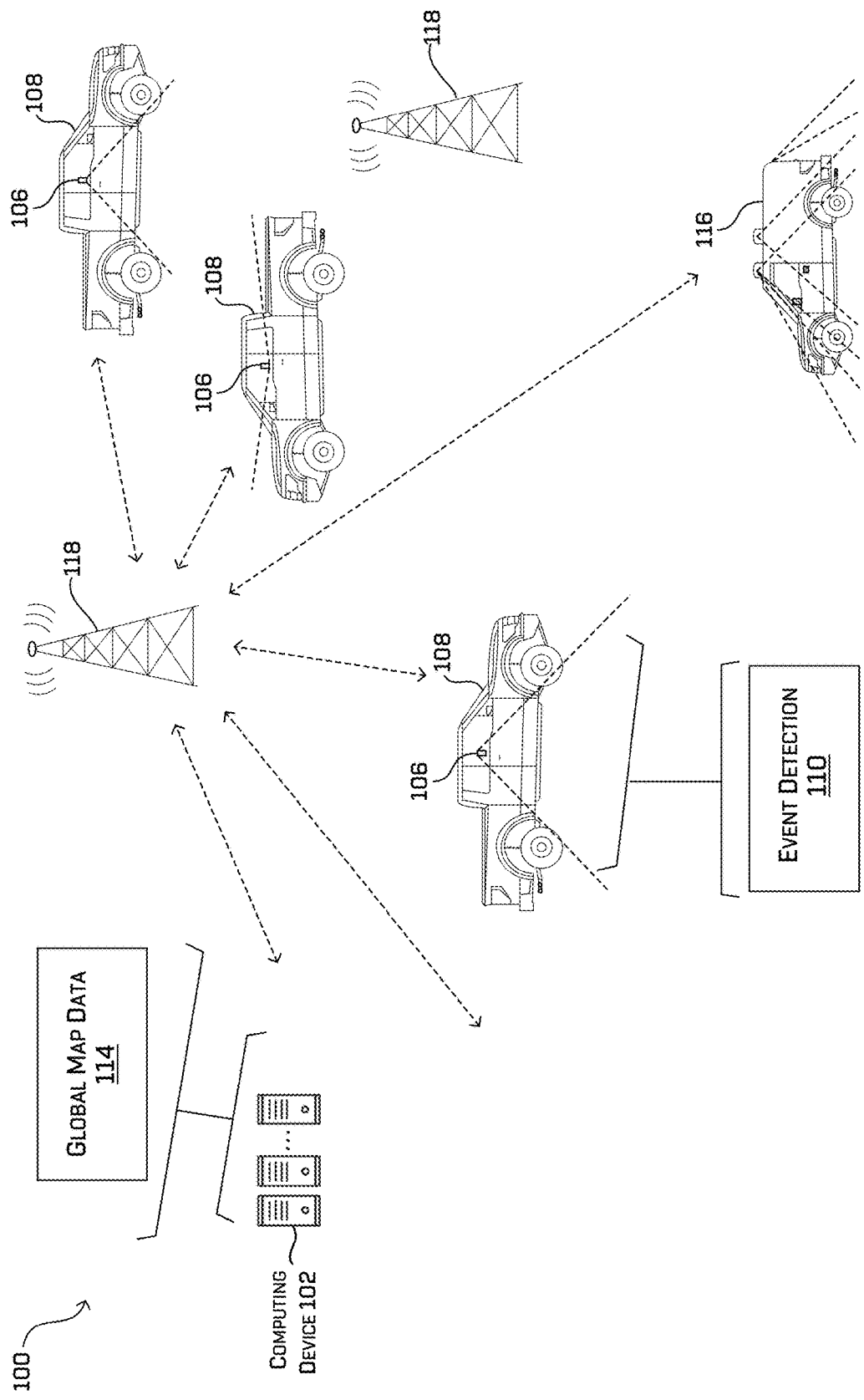
FIG. 1 is a schematic diagram of a system to collect data regarding vehicle events.

The techniques described herein can be implemented in a number of ways. Example implementations are provided below with reference to the following figures.

DETAILED DESCRIPTION

Techniques for receiving and processing sensor data captured by a fleet of vehicles are discussed herein. In some examples, vehicles in a fleet of vehicle can be equipped with dash cameras that capture image data and other sensor data as the vehicles traverse an environment. From the captured data, techniques can include determining simulation scenarios and evaluating an autonomous vehicle controller or detecting and logging adverse events on a global map.

Maneuvering and navigating autonomous vehicles by relying solely on sensor data requires significant bandwidth and processor power. Receiving data from proximity sensors, video cameras, and other sensors, processing the data, formulating an appropriate response and taking action generally must be done in real-time (or nearly real-time), which requires fast communications busses and fast processors. Some demand can be removed from this process by using data to predict and avoid dangerous events such as collisions and near collisions.

Vehicles may encounter adverse events as they traverse an environment, such as collisions or near-collisions. As used herein, the term "collision" relates to a vehicle contacting another object. In some examples, the other object can be another motor vehicle. In other examples, the object can be a stationary object such as tree, pole, post, railway, or building. The term "near-collision" refers to when a vehicle narrowly avoids contacting another object. A "near-collision" event can be classified using different parameters including the proximity of the vehicle to the object, an abrupt acceleration of the vehicle as it comes into vicinity of an objection, or combinations thereof.

As explained herein, sensor data representing adverse events can be useful in operating an autonomous vehicle. This data can be collected using sensor on a vehicle. In some examples, the sensors can be embedded in the vehicle. In other examples, an electronic device such as a dashcam can be attached to the vehicle to collect collision and near-collision data. Installing dashcams in a fleet of vehicles such as delivery vehicles, taxis, semi-trucks, or other vehicles the drive large volumes per day would be optimal to collect the maximum amount of data on collisions and near-collisions.

As used herein, a "dashcam" can be a sensor system attached to a vehicle that was not originally designed to include the dashcam. Dashcams can have visual cameras, onboard memory, GPS or IMU units, etc. A dashcam can be configured to record visual information regarding a path of travel of vehicle and store the visual information via onboard memory for later retrieval. The visual information can include information related to a collision or other adverse event effecting vehicle(s), pedestrian(s), or other objects. A dashcam can be mounted to a dash of a vehicle, a windscreen, a rear-view mirror, etc. A dashcam can couple to the host vehicle for the host vehicle to provide power to the dashcam. A dashcam can be a self-contained and portable device that can be removably coupled between various vehicles without requiring extensive modification to the host vehicle. A dashcam may be moved between vehicles without the use of tools. A dashcam can include a sensor body, an attachment mechanism, and/or a power cord to receive power from a host vehicle.

In some examples, data from one or more dashcam systems indicative of a collision and near collision event to be used to create simulated scenarios. In at least some examples, such simulations can be used to test a controller of an autonomous vehicle. Simulations can be used to validate software (e.g., an autonomous controller) executed on autonomous vehicles to ensure the software is able to safely control such autonomous vehicles. In additional or alternative examples, simulations can be used to learn about the constraints of autonomous vehicles that use the autonomous controller. For instance, simulations can be used to understand the operational space of an autonomous vehicle (e.g., an envelope of parameters in which the autonomous controller effectively controls the autonomous vehicle) in view of surface conditions, ambient noise, faulty components, etc. Simulations can also be useful for generating feedback for improving operations and designs of autonomous vehicles. For instance, simulations can be useful for determining an amount of redundancy that is required in an autonomous controller, or how to modify a behavior of the autonomous controller based on what is learned through simulations. Furthermore, in additional and alternative examples, simulations can be useful to inform the hardware design of autonomous vehicles, such as optimizing placement of sensors on an autonomous vehicle.

Logged data from real world driving scenarios can be used to develop or test planning or other components of an autonomous vehicle via simulation. Collision and near-miss collision events may occur vary rarely in normal driving conditions, but these types of events may be valuable for testing or developing autonomous vehicle components via simulation to, for example, determine how a certain autonomous vehicle will react in a similar situation to avoid a collision. Although dedicated sensor vehicles can be used to collect such information, through the use of the techniques disclosed herein, dashcams or other supplemental sensors that are more broadly used can be used to aid in generation of simulations for testing or developing autonomous vehicle components. The dashcams may be used to obtain more rare events (e.g., collision or near-miss collision events) than would otherwise likely to be recorded.

When creating a simulation environment to perform testing and validation, it is possible to specifically instantiate the environment with various and specific examples. Each instantiation of such an environment can be unique and defined. Enumerating all possible scenarios manually can require inordinate amounts of time and, if not every possible scenario is constructed, various scenarios can go untested. Additionally, even though multiple scenarios can be described, there is no guarantee that the additional scenarios provide any additional, useful, information. For example, incremental differences in starting positions of simulated vehicles at an intersection can only provide marginal, if any, additional useful information about the ability of an autonomous vehicle to respond in the scenario given a particular set of computer code. However, previously recorded sensor data from a system operating in an environment, such as data collected from a fleet of dashcams, provides many examples for generating scenarios. Therefore, previously recorded sensor data can be used to quickly and efficiently generate high quality scenarios for testing.

The fleet dashcam data can also be used to create a heat map that will aid in operation of the autonomous vehicle. A heat map generally maps the magnitude of a phenomenon or an event on a two-dimensional map. In some examples, the heat map can classify different areas on a map based on the relative number of phenomenon or events that have occurred in that area. The events can be instances of collisions or near-collisions as described above. In other examples, areas on the heat map can be classified based on other parameters, such as the time-to-collision for collision events detected in that area. An autonomous vehicle can use the heat map to control its operation. For example, the autonomous vehicle can operate using different modes or thresholds based on the classification of the area that it is operating in.

In some instances, the fleet dashcam system can include one or more processors and one or more non-transitory computer-readable media storing instructions executable by the one or more processors that receive sensor data captured an electronic device on a vehicle of a fleet of vehicles and uses that data to detect collision and near collision events. The data of the collision or near-collision event can be used to determine a simulation scenario and a response of an autonomous vehicle control to the simulation scenario and/ or it can be used to calculate the time-to-collision and create a heat map like the one described above.

The electronic device can comprise one or more sensors including a camera or other sensor that collects image data. In some examples, the electronic device is mounted to the dash of the fleet vehicles and/or coupled to the vehicle via an on-board diagnostic port such as an OBD-II port. In some examples, the sensors of the electronic device can collect at least one of GPS data, radar data, lidar data, or vehicle data.

The techniques described herein can be implemented in a number of ways. Example implementations are provided below with reference to the following figures. Although discussed in the context of an autonomous vehicle, the techniques described herein can be applied to a variety of systems requiring control and/or interaction with objects in an environment, and is not limited to autonomous vehicles. In another example, the systems, methods, and apparatuses can be used in an aviation or in a nautical context. Additionally, the techniques described herein can be used with real data (e.g., captured using sensor(s)), simulated data (e.g., generated by a simulator), or any combination of the two.

As shown in FIG. 1, the system 100 can include a computing device 102 and a plurality of electronic devices or dash cams 106. The electronic devices 106 may be part of or disposed in or on vehicle 108. The vehicles 108 can be members of a large vehicle fleet such as a fleet of delivery vehicles. The electronic device 106 can be a dashcam device, mobile device (e.g. smart phones, tablets, laptop computers, GPS devices, etc.), vehicle-based computers (e.g. navigation systems, control systems, sensor systems, camera arrays, etc.). In some examples, the electronic device 106 can be mounted in, or be a component of, a vehicle 108. The vehicles 108 in this example can comprise may types of road vehicles including, but not limited to motorcycles, passenger cars and trucks, delivery vehicles, semi-trucks, and taxis. The electronic device 106 generally includes at least one camera or other sensor for collecting image data. The electronic device 106 can also include an accelerometer, GPS receiver, altimeter, compass, magnetometer, gyroscope, sonar, lidar, or radar. In other examples, the electronic device 106 does not include lidar or radar.

The electronic device 106 can also include a system for communicating with the computing device including a cellular, wireless, Bluetooth, or radio frequency communication channel. In some examples, the electronic devices 106 can communicate with the computing device 102 via a cellular connection over one or more cell towers 118. In other examples, the electronic device 106 can store data that can be downloaded to the computing device 102 using a wired connection.

In some examples, the fleet of vehicles 108 includes vehicles of generally the same type having the same electronic devices 106 capturing the same amount and type of data. In other examples, the fleet can include different types of vehicles 116 have more or fewer sensors than other vehicles 108 in the fleet. For example, the fleet of vehicles can include both driver-controlled and autonomous vehicles. The fleet of vehicles can include vehicles 108 having one dash-mounted electronic device as well as vehicles 116 containing a suite of sensors collecting data.

The electronic devices 106 or other sensors of the vehicles 108, 116 collect data on the area viewable by the sensors of the electronic device. The collected data is analyzed to detect notable events 110. In some examples, the event detection function 110 targets vehicle collisions or near-collisions (collectively, "adverse events"). The adverse events can involve the vehicle 108 that houses the electronic device or can involve another vehicle or vehicles. In some examples, the electronic device 106 stores sensor data representing the vehicle's 108 entire trip. The sensor data is uploaded to the computing device 102 where the data is analyzed for event detection 110. In other examples, the event detection 110 is performed by the electronic device 106 and only data proximate (e.g., in time) to the adverse event is uploaded to the computing device 102. In some examples, the computing device 102 includes global map data 114. The adverse events detected by the event detection function 110 can be plotted onto or otherwise associated with the global map data 114. In some examples, the adverse event or hazard event can be something other than a collision or near-collision event. Some examples of adverse events that can be captured by the electronic devices include violations of road signs or signals such as a vehicle running a red light or stop sign. Other examples of adverse events or adverse conditions include stationary objects in a roadway, non-vehicle objects in a roadway such as animals, standing water, snow, or ice.

Figure 2A:
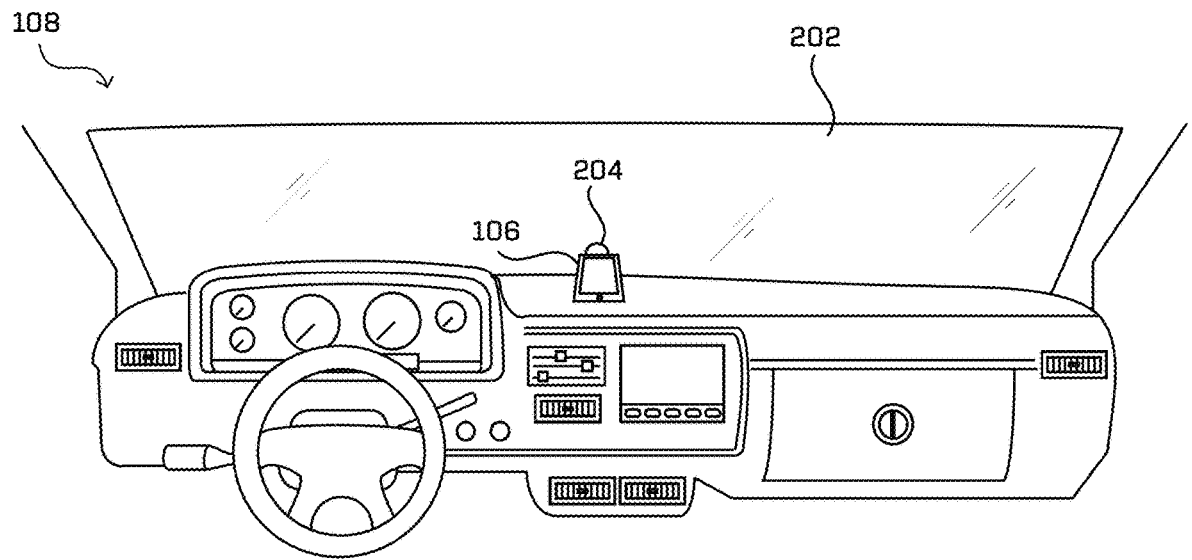
FIGS. 2A and 2B depict a forward-facing configuration for an example electronic device for use with the system of FIG. 1.

As shown in FIG. 2A, in some examples the electronic device 106 can be mounted to the windshield 202 of the vehicle 108. The electronic device 106 can be mounted to the windshield using a suction cup mount 204, for example, a dash mount or other suitably stable mount. The suction cup mount 204 can provide an unobstructed view forward for the camera on the electronic device 106. In some examples, the electronic device 106 can be mounted to another portion of the vehicle 108 including the dashboard, rearview mirror, or an exterior portion of the vehicle. In some examples, the electronic device 106 is detachably mounted to the vehicle 108 such that it is portable. For example, the electronic device 106 can be attached to a mount or other part of the vehicle 108 using a detachable coupling device such as a clip, slot, hook-and-lope fastener or other attachment means that can be easily detached and reattached repeatedly. Using the detachable coupling device, the electronic device 106 can be detached from the vehicle 108 to download collected data as described below, or a single electronic device 106 can be used in multiple vehicles. For example, a single electronic device 106 can be moved between a fleet or work vehicle and a personal vehicle in order to collect the maximum amount of data.

A computing device, such as a computing device of a vehicle dash cam, may receive sensor data representing an environment. In some examples, the sensor data may be received from one or more sensors on the dash cam and/or the vehicle itself. By way of an example and not a limitation, such sensors of the dash cam or vehicle can include one or more lidar sensor(s), radar sensor(s), ultrasonic transducer(s), sonar sensor(s), location sensor(s), inertial sensor(s), camera(s), microphone(s), wheel encoder(s), environment sensor(s), and/or the like. The electronic device 106 can include sensors for collecting image data, GPS data, radar data, lidar data, or sonar data. In some examples, the electronic device 106 can be configured to collect vehicle data collected by the vehicle's on-board diagnostics ("OBD") system. The electronic device 106 can connect to the OBD system using a wired connection, such as an OBD-II connection, or a wireless or near-field connection such as Bluetooth. The OBD system can report data including speed, acceleration, and direction.

In some examples, the electronic device 106 can include an internal power source, such as a battery. The battery can be rechargeable. In some examples, the electronic device 106 can include a solar power collection strip to assist in recharging the electronic device battery. In other examples, the electronic device 106 does not include an internal power source, such as a battery, but instead draws power from the vehicle 108 via a wired connection.

Figure 2B:
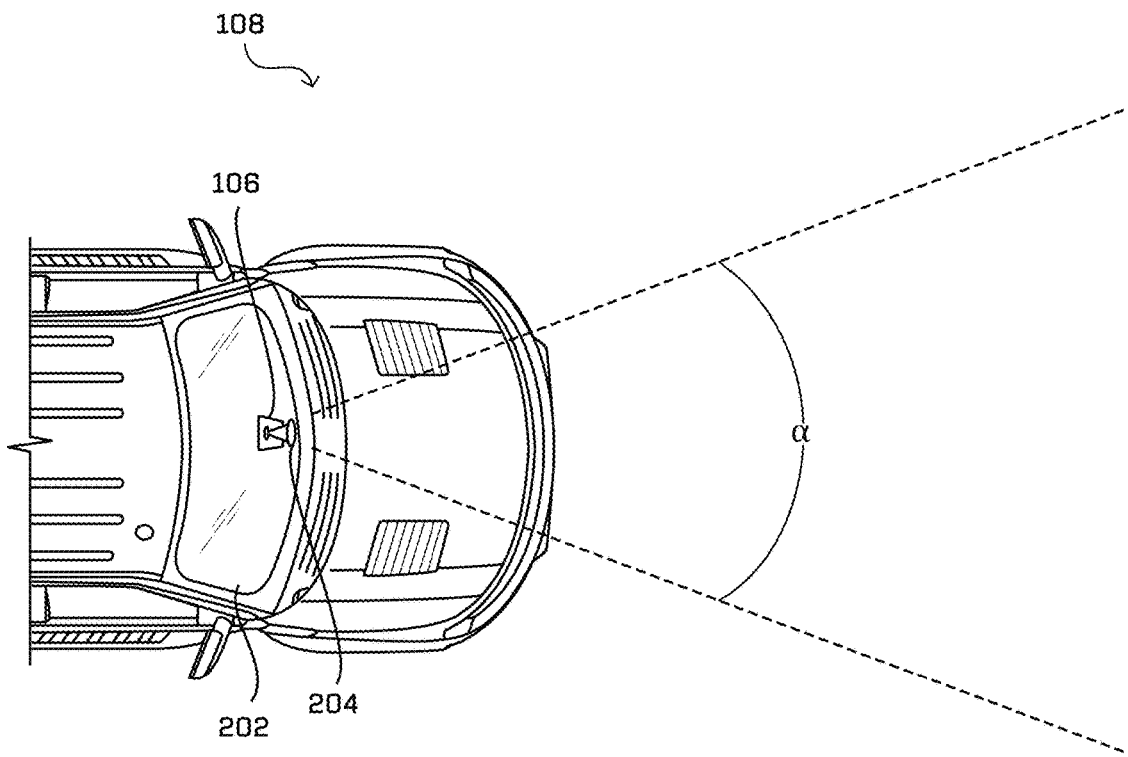

As shown in FIG. 2B, mounting the electronic device 106 on the windshield 202 provides a substantially unobstructed view out the front of the vehicle 108 over the viewing angle, a of the lens of the camera on the electronic device 106. The electronic device 106 could also be mounted on the outside of the windshield, on the hood, in the grill, or in another appropriate location on the vehicle 108. In other examples, the electronic device 106 can utilize one or more embedded cameras on the vehicle 108 (e.g., parking cameras). In this manner, a fairly wide swath of the road on which the vehicle 108 is traveling can be monitored for events 110. The forward-facing placement may also enable more thorough image analysis, because the scene is changing more slowly, than the scene from a side-facing camera for example.

Figure 3A:
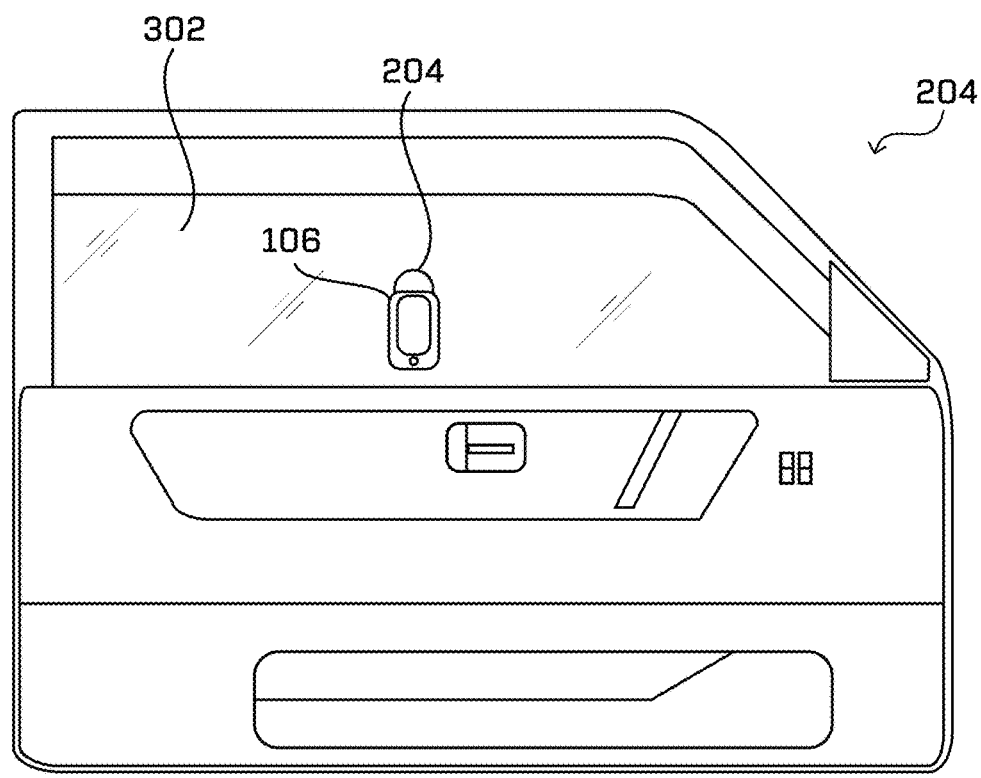
FIGS. 3A and 3B depict a side-facing configuration for an example of an electronic device for use with the system of FIG. 1.
Figure 3B:
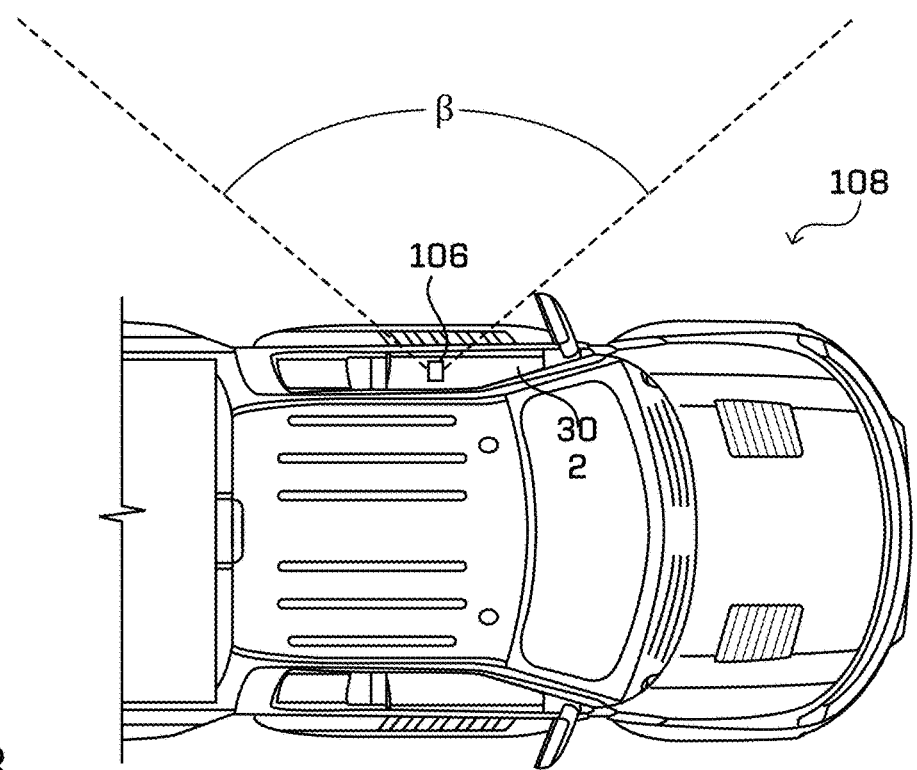

As shown in FIGS. 3A and 3B, in some examples, the electronic device 106 can be mounted to the side of the vehicle 108 or can be a side-mounted vehicle camera (e.g., a parking camera). The electronic device 106 can be mounted to the side window 302 using a suction cup mount 204, for example, or can be clipped to the door panel or window track. In this configuration, the camera for the electronic device 106 has a side facing perspective. As a result, the camera is almost completely unobstructed by the vehicle 108 over the viewing angle, β, of the camera.

In some examples, α and β may be substantially the same. In other examples, a and β may be different because of the different orientation of the cameras. In some examples, depending on the type of camera, the vehicle 108, and the orientation of the camera, α and β may vary between approximately 30 degrees and 180 degrees.

In some examples, the electronic device 106 can be mounted with a slightly forward or rearward orientation, or a semi-side view. In this position, a compromise between the forward-looking and side-looking camera can be achieved. In other words, more data may be available in this position than in the purely forward view, yet bandwidth may be somewhat decreased in comparison to the purely side view.

In some examples, the electronic device 106 can be configured to simultaneously capture image data of a forward-facing view, one or more side views, and/or a rear-facing view.

Figure 4:
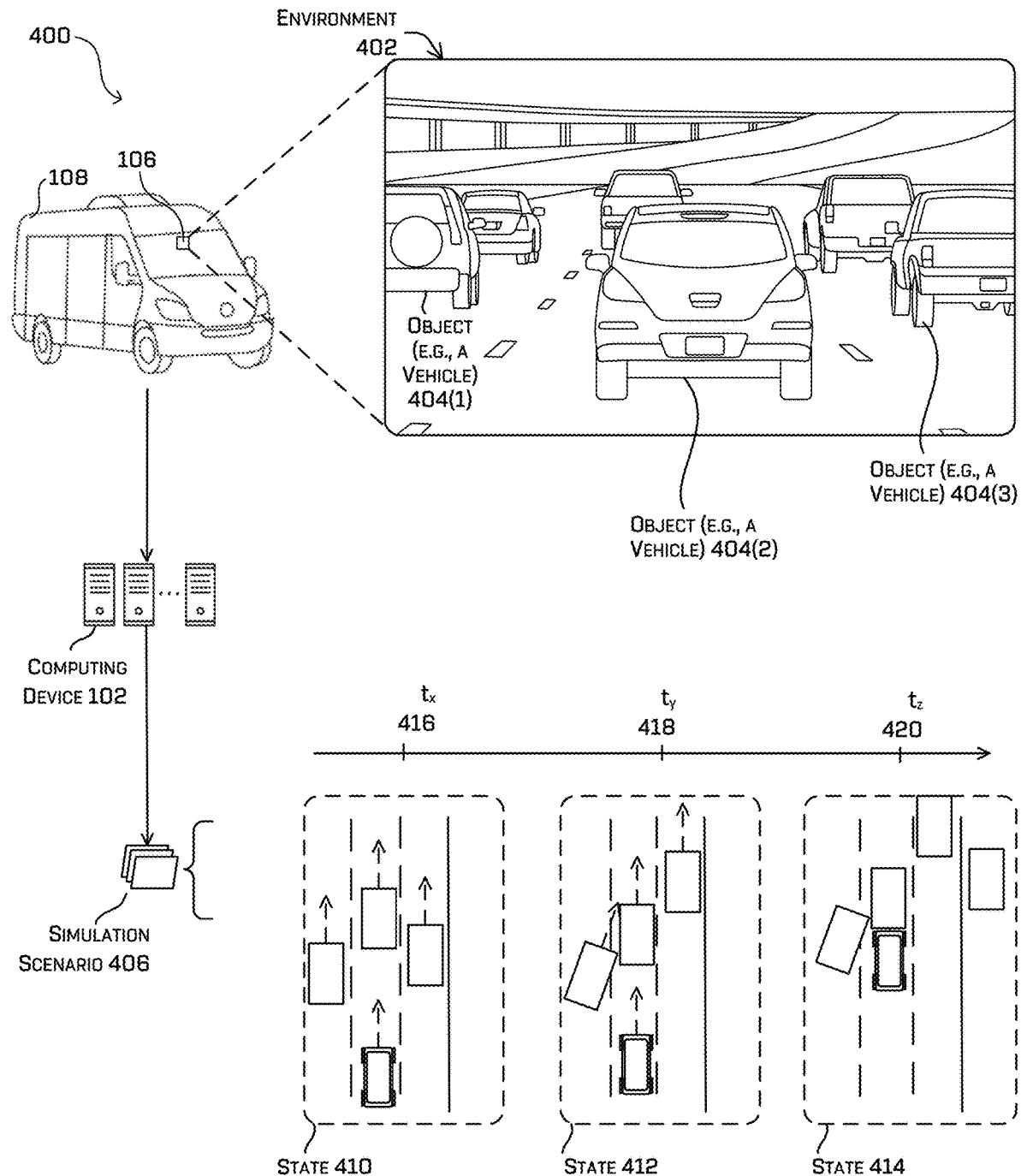
FIG. 4 is an illustration of a vehicle generating data and transmitting the data to a computing device that, when executed by a simulator, represent a simulated vehicle and simulated objects in a simulated environment at multiple instances of time.

FIG. 4 illustrates a pictorial flow diagram 400 that depicts a vehicle 108 collecting data depicting an environment 402 through which the vehicle is traveling and a scenario generator generating an example scenario using the data. The electronic device 106 of the vehicle 108 can detect objects 404(1), 404(2), 404(3) as shown. While objects 404(1), 404(2), 404(3) are depicted as vehicles in the environment 402, objects can also include cyclists, pedestrians, animals, road markers, signage, traffic lights, buildings, mailboxes, and/or other objects. In some instances, the sensor data can be associated with other objects including, but not limited to, buildings, road surfaces, signage, barriers, etc. Therefore, in some instances, the sensor data can be associated with dynamic objects and/or static objects. The dynamic objects can be objects that are associated with a movement (e.g., vehicles, motorcycles, cyclists, pedestrians, animals, etc.) or capable of a movement (e.g., parked vehicles, standing pedestrians, etc.) within the environment 402. The static objects can be objects that are associated with the environment 402 such as, for example, buildings/structures, road surfaces, road markers, signage, barriers, trees, sidewalks, etc. In some instances, the computing device 102 can compare static object locations in the environment 402 to static objects in the global map data 114. This comparison can be used to calibrate the data collected by the electronic device 106. The vehicle can transmit the data to the computing device 102 via a network or other method of data transfer.

The data representing the environment 402 can be transferred to the computing device 102. The data can represent the environment 402 over a period of time. The electronic device 106 can be configured to determine an event of interest or adverse event 110 and generate an event marker associated with the event of interest in the data. In some examples, classification of an event of interest can be based, at least in part on data from an accelerometer. For example, electronic device 106 can use the accelerometer data to determine that an amount of acceleration meets or exceeds a threshold at a certain time as an indicia of an adverse event or adverse condition in the roadway. The electronic device 106 or the computing device 102 can classify the data collected around that time as an adverse event or an adverse condition. The electronic device 106 can be configured to associate sudden braking events, as determined when the accelerometer detects a negative acceleration below a certain threshold, as an event of interest and generate an event marker associated with the sudden braking event. In some examples, the accelerometer can be configured to detect lateral acceleration and can detect sudden lane changes or lateral movement of the vehicle. In such cases, a lane change with an acceleration of a certain threshold can be classified as an adverse event. Other types of sensors can be used, alone, or in combination to detect adverse events or conditions.

In some examples, an adverse event 110 can be detected using image or video data collected by the electronic device 106. The image or video data can be used to determine whether an object came within a threshold distance of a vehicle 108 or if the object came within a threshold distance of another object. In some examples, the electronic device 106 does not capture radar or LIDAR data to determine the relative position of objects and their distance from the vehicle 108 or each other. In those examples, the image data can be processed to determine the positions of objects in the image data. For example, the image data can be analyzed to locate objects of a known size including other vehicles, known landmarks, or objects of a standard size such as road signs. Using an object or objects of a known size, the image data can be processed to estimate the relative distance between objects. Additional information on estimating distances from image data is explained in U.S. patent application Ser. No. 15/453,569 titled "Object Height Estimation from Monocular Images" filed on Mar. 8, 2017 which is incorporated by reference in its entirety and for all purposes.

After receiving the data, the computing device 102 can generate a simulation scenario 406 using a period of time in the data. The data can include states 410, 412, 414 of the environment that are associated with times $t_0$ 416, $t_1$ 418, and $t_2$ 420. At time $t_0$ 416 the state 410 can represent a vehicle 108 as traversing the environment 402 with objects 404(1), 404(2), 404(3) (e.g., dynamic objects such as different vehicles) in driving lanes in front of the vehicle 108. At a time $t_1$ 418 that is after $t_0$ 416, the state can represent the vehicle 108 as traversing the environment and decelerating at a level over a threshold to detect a sudden braking event 110. At least some of the objects 404(1), 404(2), 404(3) may be in a collision configuration (e.g. where one object has contacted another object. At a time $t_2$ 420 that is after times $t_0$ 416 and $t_1$ 418, the state 414 can represent the vehicle 108 at the time of a collision with an object 404.

The data can be transmitted to the computing device 102 that is executing a scenario generator. The scenario generator can generate simulation instructions, based at least in part on the data that, when executed by a simulator, can generate simulation data that represents states 410, 412, and 414 of a simulated environment that are associated with times $t_0$ 416, $t_1$ 418, and $t_2$ 420. Additional information on scenario generators is explained in U.S. patent application Ser. No. 16/457,745 titled "Synthetic Scenario Simulator Based on Events" filed on Jun. 18, 2019 and U.S. patent application Ser. No. 16/224,385 titled "Event-Based Data Logging" filed on Dec. 18, 2018 which are incorporated by reference in its entirety and for all purposes.

Figure 5:
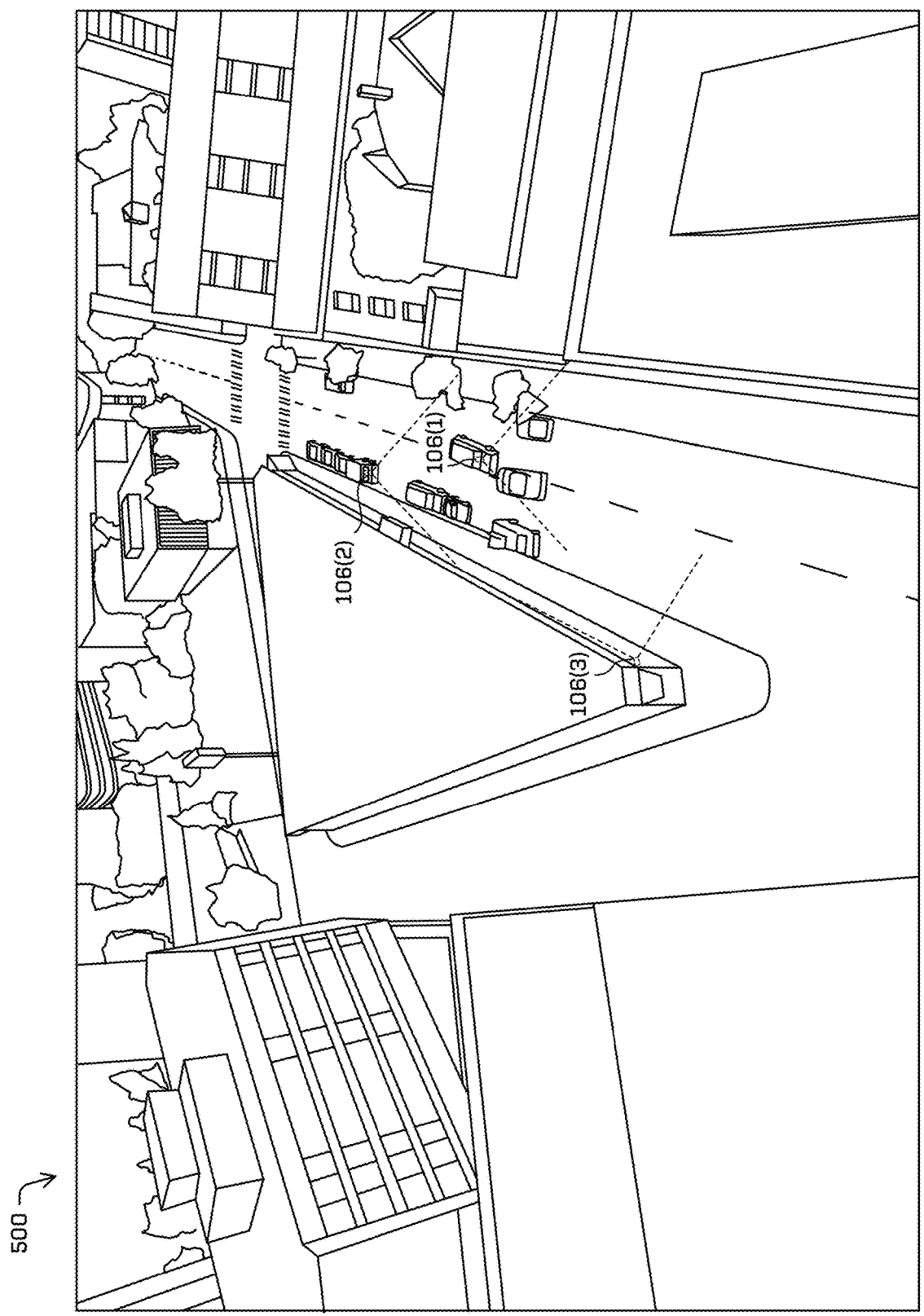
FIG. 5 is an illustration of multiple electronic devices generating data to transmit to a computing device.

FIG. 5 shows an example adverse event 500 captured by multiple electronic devices 106(1), 106(2), 106(3). In some examples, an adverse event may be detected by multiple electronic devices 106(1), 106(2), 106(3) and the data collected from the devices can be compiled to create the simulation scenario 400. In some instances, the electronic devices 106(1), 106(2), 106(3) may not all be the same model with the same types of sensors. For example, some of the electronic devices 106(1), 106(2) may be mounted dashcams and other electronic devices 106(3) may be security cameras or other recording devices attached to a stationary object. In other examples, the electronic device can include data collected from a mobile device such a cell phone. In some examples, due to the different sensors used in each electronic device, the data collected from each device may not be in the same format. The computing device 102 that process the data can include a database of electronic devices 106. The computing device 102 can identify the type of electronic device 106 that collected the data showing the adverse event and, if necessary, apply a correction factor such that the data may be more easily compared to data collected from other electronic devices showing the same adverse event. Correction factors may include changing the color ratio or aspect ratio of image data or converting the units of other data such as speed and acceleration.

The computing device 102 may analyze the image data from each electronic device 106(1), 106(2), 106(3) to correlate the data using common landmarks or events. For example, landmarks common to the image data captured from the electronic devices 106(1), 106(2), 106(3) can be used to determine the relative position of each electronic device and the position and movement of objects relevant to the adverse event. In some examples, a common event detected by each electronic devices 106(1), 106(2), 106(3) can be used to synchronize or align the time of each electronic device. For example, rather than rely on a clock in each electronic device, which may not be synchronized with the clocks of the other electronic devices, the timing of the image data of an adverse event can be measured relative to an event common to the image data of each electronic device, such as the time a certain vehicle entered an intersection or the time a traffic light changed or the relative positions of various objects represented in the scene at various points in time.

In some examples, an electronic device 106(1) may detect an adverse event. Other electronic devices 106(2), 106(3) may be in the vicinity of the adverse event and in a position to capture the adverse event itself or the actions preceding the adverse event. However, the other electronic devices 106(2), 106(3) may not have independently detected adverse event conditions that cause the electronic device to flag or store its data. In some examples, the electronic device 106(1) that detects the adverse event can send a wireless signal to other electronic devices 106(2), 106(3) in the vicinity to flag or store their data. Example wireless communication modes include one or more of cellular communication, Bluetooth Low Energy, LoRaWi-Fi, WirelessHD, WiGig, Z-Wave, Zigbee, AM/FM, RFID, NFC, etc. The detecting electronic device 106(1) can send out a signal using one of these communication modes that causes the non-detecting electronic devices 106(2), 106(3) to flag or store data preceding and following receipt of the signal. In some examples, the signal and include a unique adverse event identifier code such that when the data from all three electronic devices 106(1), 106(2), 106(3) is collected by the computing device 102, the data can be identified as being associated with the same adverse event. Additional information on communication between electronic devices is explained in U.S. patent application Ser. No. 15/673,728 titled "Shared Vehicle Obstacle Data" and filed Aug. 10, 2017, which is hereby incorporated by reference in its entirety and for all purposes.

Figure 6:
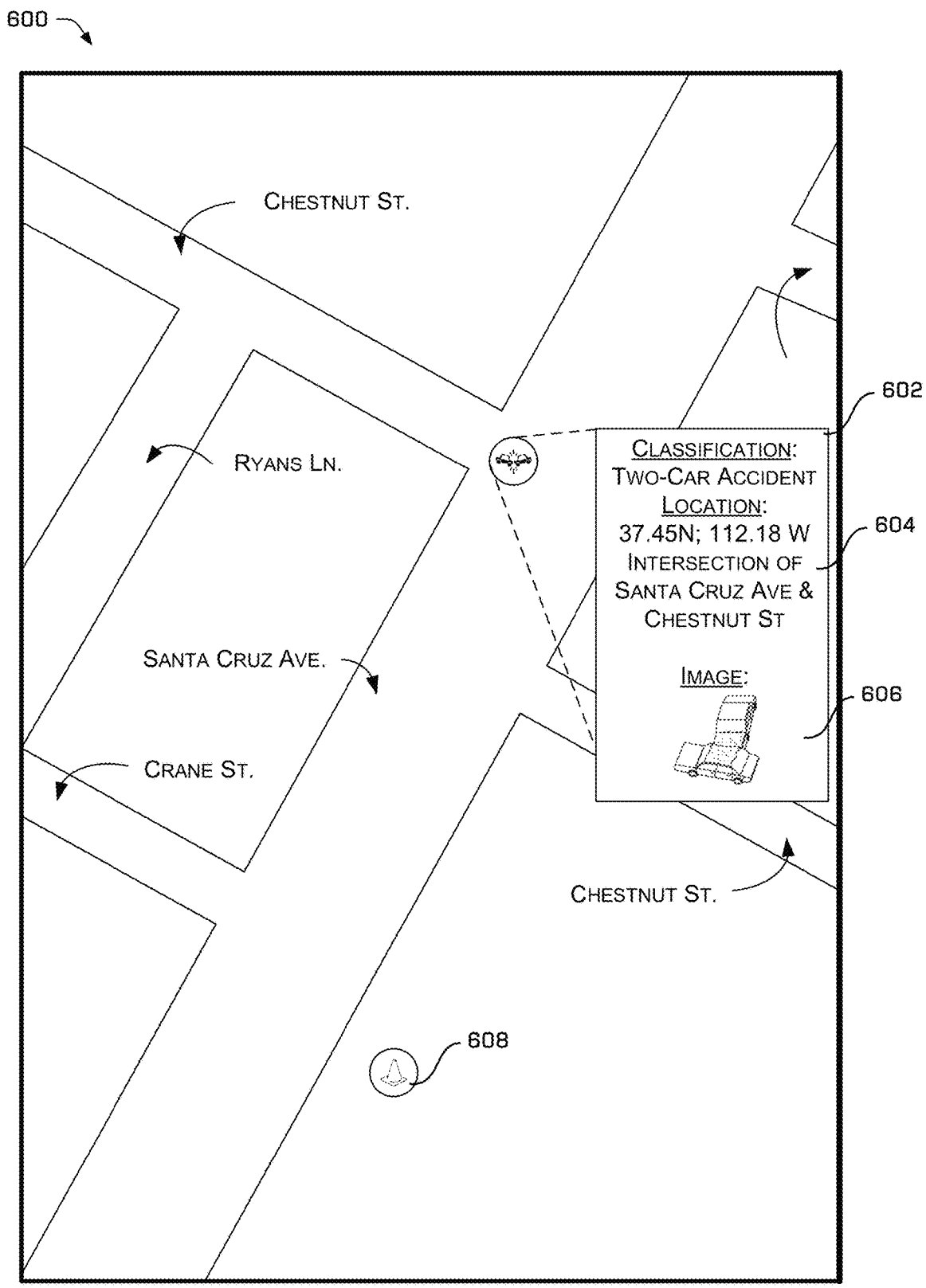
FIG. 6 is an example global map generated by data collected by an electronic device.

FIG. 6 illustrates an example adverse event log 600 stored in the global map data 114 of a computing device 102. When the event detection process 110 detects an event of note like an adverse event, the log of the event 600 is stored in the global map data 114. FIG. 6 is a visualization of the event log 600. This process can be done separately or in conjunction with the scenario simulation process 400 described above. An event log 600 can include a classification of the event 602 and the location of the event 604. In the illustrative example, the event log 600 is classified as a two-car accident. The log 600 also stores the location of the event 604 and an image 606. In some examples, the event log 600 can include additional metrics related to the event including time of day, the respective vehicles' speed, or time-to-collision ("TTC").

In some examples, the electronic device 106 does not include a GPS or other sensor that reports the location of an adverse event. In such examples, the location can be determined using known landmarks 608. For example, the global map data 114 can include a database of known static landmarks 608 such as buildings, road signs, or geographical landmarks. Image data associated with the adverse event can be analyzed to identify a landmark stored in the global map data 114. The landmark 608 can be used to determine the approximate location of the adverse event. In some example, the landmark 608 may be visible in image data preceding or following the data showing the adverse event. In such instances, other data, such as a speed data or compass data can be analyzed to determine the position of the adverse event relative to the landmark 608.

The TTC represents the amount of time between when the time driver or vehicle recognizes a scenario that may lead to a collision $t_a$ and the time that the collision occurs $t_c$. In some examples, $t_a$ can be assessed by measuring the acceleration of a vehicle. When the negative acceleration reaches a threshold the electronic device or computing device can classify a braking event. The time of the braking event can be time $t_a$. In other embodiments, thresholds can be set to detect a jerk of the steering wheel which can set time $t_a$. In other examples, image data can be used to determine time $t_a$ by detecting a change in the environment such as brake lights or an object entering the environment. The time of collision $t_c$ is the time when the vehicle or vehicles involved in the collision make contact. The time of contact $t_c$ can be determined using image data, acceleration and velocity data, or sound data. The difference between $t_a$ and $t_c$ gives us the time to collision.

Figure 7:
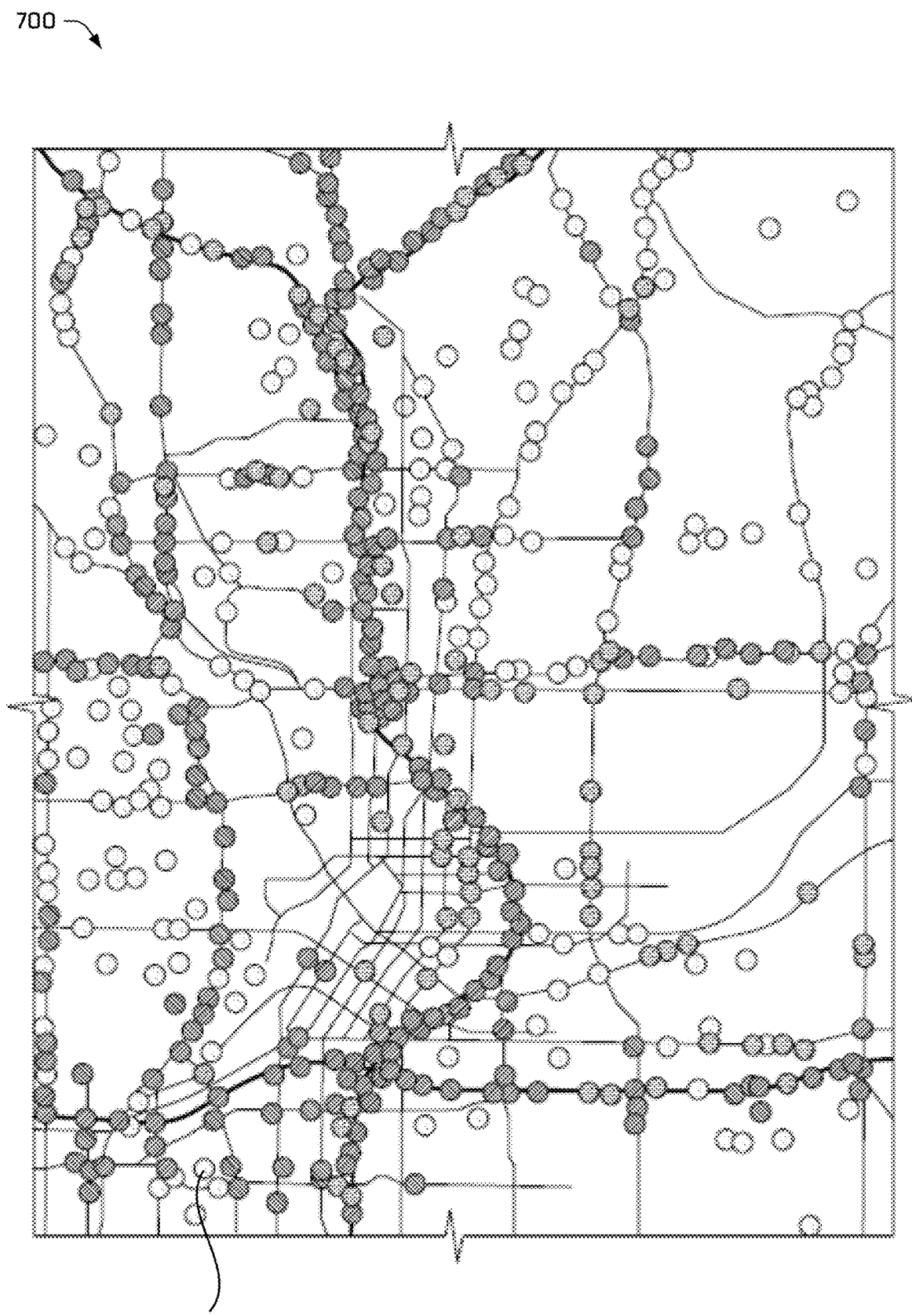
FIG. 7 depicts an example heat map created by collecting data representing events.

FIG. 7 shows a heat map 700 that can be created using event logs 600 like the one shown in FIG. 5. The heat map 700 can be created by plotting event logs 600 onto the global map data 114 of the computing device 102. Areas of the map 702 are assigned values based on the probability of an occurrence of an adverse event in that area. Statistical analysis can be performed on the event log data 600 in the global map 114 to determine the value associated with each area 702. For example, the heat map 700 can assign areas a value based on the number of events that occurred in that area. An area of the heat map 702 can be assigned a value based on the relative number of adverse events that occur in that area with a higher value indicating a larger number of adverse events. In other examples, the areas 702 of the heat map 700 can be assigned a value based on another metric of the event logs 600. For example, the areas 702 of the heat map 700 can be assigned a value based on the relative average TTC of the adverse events that occur in that area 702 with a higher value being assigned the shorter the average TTC. In other examples, the value assigned to an area 702 of the heat map 700 can be based on a number of factors. Statistical analysis can be performed to determine the factor, or combination of factors that correlate with instances of adverse events and that factor or those factors can be used to assign values to the areas 702 of the heat map 700.

Figure 8:
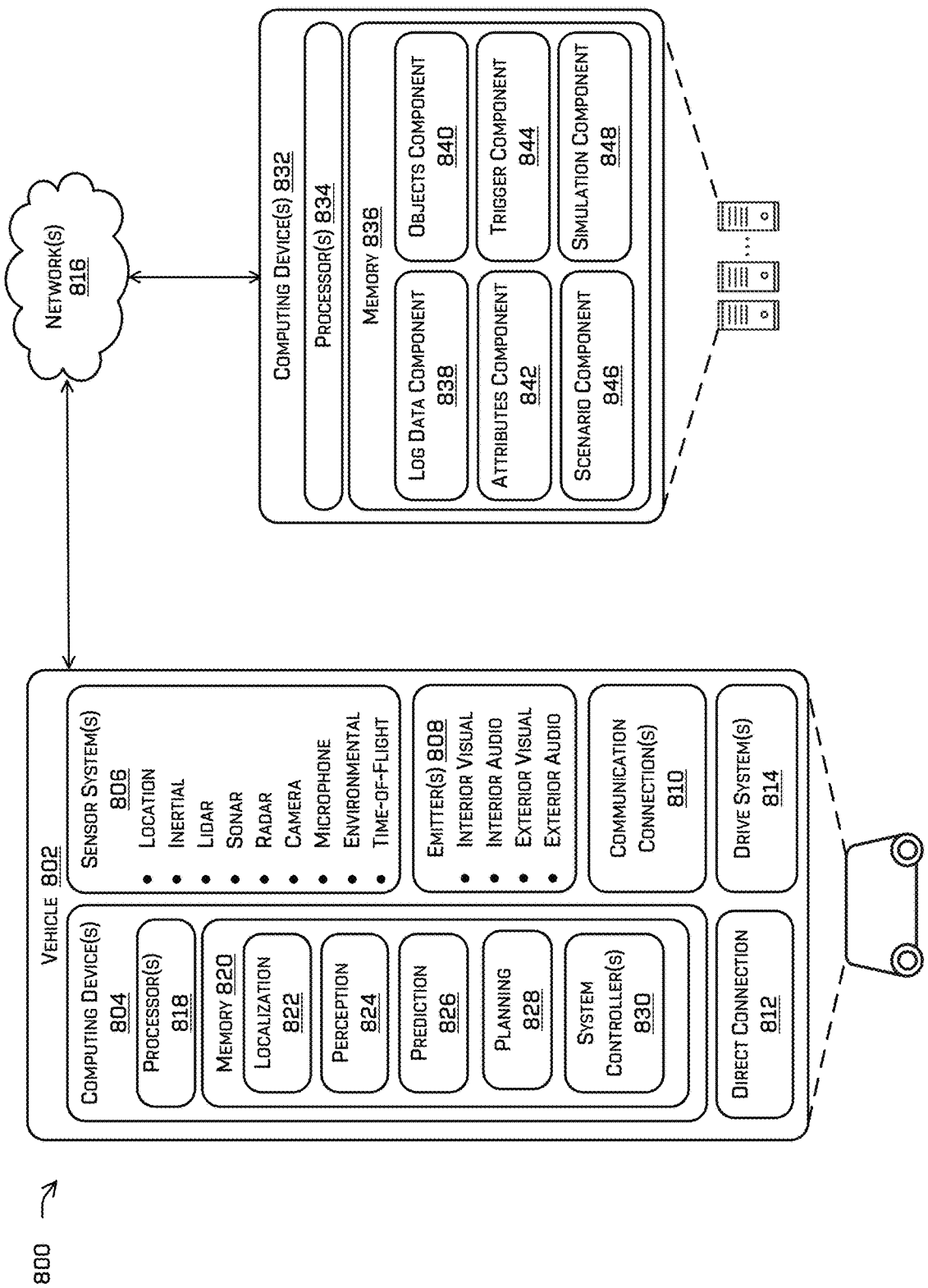
FIG. 8 depicts a block diagram of an example system for implementing the techniques described herein.

An autonomous vehicle, like the one described in FIG. 8, uses the heat map 700 to inform its controls. For example, the autonomous vehicle can plan its route to avoid areas 702 of the heat map 700 with values over a certain threshold. In other examples, the autonomous vehicle can enter a different operating mode depending on the value assigned to the area 702 of the heat map 700 it is currently traversing. For example, the autonomous vehicle can adjust its speed or the amount of data being collected by its sensors depending on the value of the area 702 of the heat map 700.

FIG. 8 depicts a block diagram of an example system 800 for implementing the techniques discussed herein. In at least one example, the example system 800 can include a vehicle 802. In the illustrated example system 800, the vehicle 802 is an autonomous vehicle; however, the vehicle 802 can be any other type of vehicle.

The vehicle 802 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 802 can be configured to control all functions from start to completion of the trip, including all parking functions, it may not include a driver and/or controls for driving the vehicle 802, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 802 can be any configuration of vehicle, such as, for example, a van, a sport utility vehicle, a cross-over vehicle, a truck, a bus, an agricultural vehicle, and/or a construction vehicle. The vehicle 802 can be powered by one or more internal combustion engines, one or more electric motors, hydrogen power, any combination thereof, and/or any other suitable power sources. Although the vehicle 802 has four wheels, the systems and methods described herein can be incorporated into vehicles having fewer or a greater number of wheels, and/or tires. The vehicle 802 can have four-wheel steering and can operate generally with equal or similar performance characteristics in all directions, for example, such that a first end of the vehicle 802 is the front end of the vehicle 802 when traveling in a first direction, and such that the first end becomes the rear end of the vehicle 802 when traveling in the opposite direction. Similarly, a second end of the vehicle 802 is the front end of the vehicle when traveling in the second direction, and such that the second end becomes the rear end of the vehicle 802 when traveling in the opposite direction. These example characteristics may facilitate greater maneuverability, for example, in small spaces or crowded environments, such as parking lots and/or urban areas.

The vehicle 802 can include a computing device(s) 804, one or more sensor system(s) 806, one or more emitter(s) 808, one or more communication connection(s) 810 (also referred to as communication devices and/or modems), at least one direct connection 812 (e.g., for physically coupling with the vehicle 802 to exchange data and/or to provide power), and one or more drive system(s) 814. The one or more sensor system(s) 806 can be configured to capture sensor data associated with an environment.

The sensor system(s) 806 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 806 can include multiple instances of each of these or other types of sensors. For instance, the time-of-flight sensors can include individual time-of-flight sensors located at the corners, front, back, sides, and/or top of the vehicle 802. As another example, the camera sensors can include multiple cameras disposed at various locations about the exterior and/or interior of the vehicle 802. The sensor system(s) 806 can provide input to the computing device(s) 804.

The vehicle 802 can also include one or more emitter(s) 808 for emitting light and/or sound. The one or more emitter(s) 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 802 can also include one or more communication connection(s) 810 that enable communication between the vehicle 802 and one or more other local or remote computing device(s) (e.g., a remote teleoperations computing device) or remote services. For instance, the communication connection(s) 810 can facilitate communication with other local computing device(s) on the vehicle 802 and/or the drive system(s) 814. Also, the communication connection(s) 810 can allow the vehicle 802 to communicate with other nearby computing device(s) (e.g., other nearby vehicles, traffic signals, etc.).

The communications connection(s) 810 can include physical and/or logical interfaces for connecting the computing device(s) 804 to another computing device or one or more external networks 816 (e.g., the Internet). For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 810 may comprise the one or more modems as described in detail above.

In at least one example, the vehicle 802 can include one or more drive system(s) 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include one or more sensor system(s) 806 to detect conditions of the drive system(s) 814 and/or the surroundings of the vehicle 802. By way of example and not limitation, the sensor system(s) 806 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 814. In some cases, the sensor system(s) 806 on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which can receive and preprocess data from the sensor system(s) 806 and to control operation of the various vehicle systems. In some examples, the drive system controller can include one or more processor(s) and memory communicatively coupled with the one or more processor(s). The memory can store one or more modules to perform various functionalities of the drive system(s) 814. Furthermore, the drive system(s) 814 also include one or more communication connection(s) that enable communication by the respective drive system with one or more other local or remote computing device(s).

The computing device(s) 804 can be similar to the vehicle computing device described above with reference to FIG. 1. The computing device(s) 804 can include one or more processor(s) 818 and memory 820 communicatively coupled with the one or more processor(s) 818. In the illustrated example, the memory 820 of the computing device(s) 804 stores a localization component 822, a perception component 824, a prediction component 826, a planning component 828, and one or more system controller(s) 830. Though depicted as residing in the memory 820 for illustrative purposes, it is contemplated that the localization component 822, the perception component 824, the prediction component 826, the planning component 828, and the one or more system controller(s) 830 can additionally, or alternatively, be accessible to the computing device(s) 804 (e.g., stored in a different component of vehicle 802 and/or be accessible to the vehicle 802 (e.g., stored remotely).

In memory 820 of the computing device(s) 804, the localization component 822 can include functionality to receive data from the sensor system(s) 806 to determine a position of the vehicle 802. For example, the localization component 822 can include and/or request/receive a three-dimensional map of an environment and can continuously determine a location of the autonomous vehicle within the map. In some instances, the localization component 822 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 822 can provide data to various components of the vehicle 802 to determine an initial position of an autonomous vehicle for generating a trajectory, as discussed herein.

The perception component 824 can include functionality to perform object detection, segmentation, and/or classification. In some examples, the perception component 824 can provide processed sensor data that indicates a presence of an entity that is proximate to the vehicle 802 and/or a classification of the entity as an entity type (e.g., car, pedestrian, cyclist, building, tree, road surface, curb, sidewalk, unknown, etc.). In additional and/or alternative examples, the perception component 824 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The perception component 824 can include functionality to store perception data generated by the perception component 824. In some instances, the perception component 824 can determine a track corresponding to an object that has been classified as an object type. For purposes of illustration only, the perception component 824, using sensor system(s) 806 can capture one or more images of an environment. The sensor system(s) 806 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 806, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 826 can generate one or more probability maps representing prediction probabilities of possible locations of one or more objects in an environment. For example, the prediction component 826 can generate one or more probability maps for vehicles, pedestrians, animals, and the like within a threshold distance from the vehicle 802. In some instances, the prediction component 826 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 828 can determine a path for the vehicle 802 to follow to traverse through an environment. For example, the planning component 828 can determine various routes and paths and various levels of detail. In some instances, the planning component 828 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 828 can generate an instruction for guiding the autonomous vehicle along at least a portion of the route from the first location to the second location. In at least one example, the planning component 828 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 828 can alternatively, or additionally, use data from the perception component 824 to determine a path for the vehicle 802 to follow to traverse through an environment. For example, the planning component 828 can receive data from the perception component 824 regarding objects associated with an environment. Using this data, the planning component 828 can determine a route to travel from a first location (e.g., a current location) to a second location (e.g., a target location) to avoid objects in an environment. In at least some examples, such a planning component 828 may determine there is no such collision free path and, in turn, provide a path which brings vehicle 802 to a safe stop avoiding all collisions and/or otherwise mitigating damage.

In at least one example, the computing device(s) 804 can include one or more system controller(s) 830, which can be configured to control steering, propulsion, braking, safety, emitters, communication, and other systems of the vehicle 802. These system controller(s) 830 can communicate with and/or control corresponding systems of the drive system(s) 814 and/or other components of the vehicle 802, which may be configured to operate in accordance with a path provided from the planning component 828.

The vehicle 802 can connect to computing device(s) 832 via network(s) 816 and can include one or more processor(s) 834 and memory 836 communicatively coupled with the one or more processor(s) 834. In at least one instance, the one or more processor(s) 834 can be similar to the processor(s) 818 and the memory 836 can be similar to the memory 820. In the illustrated example, the memory 836 of the computing device(s) 832 stores a log data component 838, an objects component 840, an attributes component 842, a triggering component 844, a scenario component 846, and a simulation component 848. Though depicted as residing in the memory 836 for illustrative purposes, it is contemplated that the log data component 838, the objects component 840, the attributes component 842, the trigger component 844, the scenario component 846, and the simulation component 848 can additionally, or alternatively, be accessible to the computing device(s) 832 (e.g., stored in a different component of computing device(s) 832 and/or be accessible to the computing device(s) 832 (e.g., stored remotely).

In the memory 836 of the computing device(s) 832, the log data component 838 can determine log data to be used for generating a simulated scenario. The log data can be received from electronic devices 106 on fleet vehicles 108. In some examples, the log data is transferred from the electronic device 106 to the computing device 832 via a network connection such as a cellular network. The log data can also be transferred using a wireless connection including Bluetooth™ or other Near Field Communication processes. The log data can also be transferred from the electronic device 106 to the commuting device 832 using a wired connection. As discussed above, a database can store one or more log data. In some instances, the computing device(s) 832 can act as the database to store the log data. In some instances, the computing device(s) 832 can connect to a different computing device to access the log data database. The log data component 838 can to scan log data stored in the database and identify log data that contains an event of interest. As discussed above, in some instances, the log data can include an event marker that indicates that an event of interest is associated with a particular log data. In some examples, the log data can be scanned for events of interest on the electronic device 106 of the fleet vehicle 108. The electronic device 106 can store and transfer log data containing events of interest to the computing device 832 and discard other log data.

In some instances, a selection of log data of a set of log data to be used to generate a simulated scenario. The log data can also be used to create a heat map showing the relative frequency or characteristics of different events of interest. For example, a heat map can be created categorizing different areas of the map based on the relative frequency of adverse events in the log data. In other examples, the computing device can calculate the TTC for each adverse event and areas of the heat map can be categorized based the relative TTC of adverse events in that area. In other examples, categorization of areas of the heat map can be based on a number of factors including adverse event frequency and TTC.

Additionally, the objects component 840 can identify one or more objects associated with the log data. For example, the objects component 840 can determine objects such as vehicles, pedestrians, animals, cyclists, trees, etc. in the log data and represented as simulated objects. In some instances, the objects component 840 can determine objects that interact with the vehicle associated with the log data. For purposes of illustration only, the objects component 840 can determine that an object traversed along a trajectory that began 100 meters from the vehicle and continued to traverse the environment in a direction that is away from the vehicle. The objects component 840 can determine not to incorporate that object into the simulated scenario as it did not interact with the vehicle and would not provide valuable testing/validation data.

The attributes component 842 can determine attributes associated with an object. For example, an attribute can include an object extent (also referred to as an object size, which may represent a length, width, height, and/or volume), an object classification, an object pose, an object trajectory, an object waypoint, an object instantiation attribute, and/or an object termination attribute.

As discussed above, the object extent can indicate a size and/or volume of the object (e.g., a length of 0.5 meters). The object classification can indicate a classification and/or type of the object (e.g., a vehicle, a pedestrian, a bicyclist, etc.). The object pose can indicate an object's x-y-z coordinates (e.g., a position or position data) in the environment and/or can include a pitch, a roll, and/or a yaw associated with the object. The object trajectory can indicate a trajectory followed by the object. The object waypoint can indicate a position in the environment that indicates a route between two locations.

In some instances, the attributes component 842 can filter objects based on filters to remove or discard portions of the log data. In some instances, the attributes component 842 can use an extent-based filter such that objects that are associated with an extent that does not meet or exceed the extent-based filter are removed and/or discarded from the log data. In some instances, the attributes component 842 can filter objects that do not meet or exceed a confidence threshold. By way of example and without limitation, the log data can indicate that an object is associated with a classification attribute of a pedestrian and a confidence value of associated with the classification of 5%. The attributes component 842 can have a confidence value threshold of 75% and filter the object based on the confidence value not meeting or exceeding the confidence value threshold. Additional information on filters that can be used to remove and/or discard portions of the log data is explained in U.S. patent application Ser. No. 16/392,094 titled "Scenario Editor and Simulator" and filed Apr. 23, 2019, which is hereby incorporated by reference.

The object instantiation attribute can indicate how the vehicle detected the object. For example, the object can enter a detection range of the vehicle by: (1) the vehicle approaching the object, (2) the object approaching the vehicle, and/or (3) the object becoming visible (unoccluded) or an occlusion cessation of the object. The object termination attribute can indicate how the vehicle can no longer detect the object. For example, the object can be in a position outside of the detection range of the vehicle by: (1) the vehicle moving away from the object, (2) the object moving away from the vehicle, and/or (3) the object becoming occluded or an occlusion of the object.

The attributes component 842 can determine object attributes for none, some, or all of the objects to be included in the simulated scenario. The attributes component 842 can use the determined object attributes to identify the inconsistencies in the log data. As discussed above, the attributes component 842 can use algorithms and/or techniques based on thresholds, standard deviation calculations, and/or other algorithms such as Z-Score, db scan, and/or Isolation Forests.

Additionally, the attributes component 842 can be configured to determine estimated attribute values and replace inconsistent attribute values using algorithms and/or techniques such as mean algorithms, median algorithms, mode algorithms, and/or other smoothing algorithms such as Additive smoothing, Butterworth filters, Chebyshev filters, Exponential smoothing, Kalman filters, Kernal smoothers, Local regression, and/or moving averages, etc.

The trigger component 844 can determine a trigger region associated with a simulated object. In some examples, the trigger region can correspond to a region of the environment that, when a simulated object (such as a simulated autonomous vehicle) is located within a threshold distance of, the simulated object can be instantiated or removed (e.g., destroyed) from the scenario, as discussed herein. For example, the log data can indicate that the vehicle detected a pedestrian at a particular distance ahead of the vehicle as the vehicle traversed along a trajectory. The scenario generator can determine a trigger region based on the distance and instantiate the simulated pedestrian in the simulated environment when the simulated vehicle reaches the trigger region. In some instances, the scenario generator can determine a trigger region to increase a likelihood of interaction with an object. In some instances, the trigger region can cause an action of a simulated object (e.g., when activated, cause an object to perform a lane change action).

In some instances, the trigger component 844 can determine an instantiation trigger region associated with multiple objects. By way of example and without limitation, the trigger component 844 can determine an instantiation trigger region such that when a simulated vehicle crosses the instantiation trigger region, a simulated pedestrian object is instantiated on a sidewalk 85 meters in front of the simulated vehicle and a simulated oncoming vehicle object is instantiated in an opposing traffic 100 meters in front of the simulated vehicle.

In some instances, the trigger component 844 can determine multiple trigger regions associated with a single object. By way of example and without limitation, a first region can be an instantiation trigger region associated with instantiating a simulated object when activated by a simulated vehicle. Additionally, a second region can be an action trigger region associated with causing the simulated object to perform an action (e.g., cause a simulated pedestrian to begin to cross the street at a crosswalk).

In some instances, the trigger component 844 can determine a trigger event associated with the simulated vehicle and/or simulated objects that cause an instantiation, a destruction, and/or an action of another object. By way of example and without limitation, the trigger component 844 can determine a trigger event associated with the simulated vehicle based on the simulated vehicle enabling an indicator to initiate a lane change action. The simulation component 848, as discussed in further detail below, can determine that enabling the indicator triggers an event associated with a simulated object in a lane adjacent to the simulated vehicle to accelerate. By way of an additional example and without limitation, a trigger event can be associated with a simulated object that when the simulated object passes a crosswalk, a simulated pedestrian will begin crossing the crosswalk.

The scenario component 846 can use the log data identified by the log data component 838 to generate a simulated scenario. The simulated scenario includes a simulated environment (e.g., roadways, road markers, buildings, etc.) and simulated objects (e.g., other vehicles, pedestrians, cyclists, animals, etc.). In some instances, the scenario component 846 can use the perception data generated by the perception component 824 to apply simulated object models to the simulated objects. For example, the scenario component 846 can identify a simulated vehicle model and apply it to the simulated objects associated with vehicles. In some instances, the scenario component 846 can identify a simulated pedestrian model and apply it to the simulated objects associated with pedestrians. In some instances, the simulated object models can use controllers that allow the simulated objects to react to the simulated environment and other simulated objects (e.g., modeling physics-based behaviors and incorporating collision checking). For example, a simulated vehicle object can stop at a crosswalk if a simulated pedestrian crosses the crosswalk as to prevent the simulated vehicle from colliding with the simulated pedestrian.

In some instances, the scenario component 846 can identify objects associated with an adverse event captured by the electronic devices 106 of the fleet vehicles 108. The scenario component 846 can created a simulated scenario with simulated objects that mimic the movements of the vehicles or other objects preceding the adverse event.

In some instances, the scenario component 846 can identify a simulated pedestrian model and apply it to the simulated objects associated with pedestrians. In some instances, the simulated object models can use controllers that allow the simulated objects to react to the simulated environment and other simulated objects (e.g., modeling physics-based behaviors and incorporating collision checking). For example, a simulated vehicle object can stop at a crosswalk if a simulated pedestrian crosses the crosswalk as to prevent the simulated vehicle from colliding with the simulated pedestrian.

In some instances, the log data can indicate that a particular object has a characteristic and apply that characteristic to the simulated object. For purposes of illustration only, the log data can indicate that an object travels at approximately 10 mph below the speed limit and accelerates slowly. The scenario component 846 can determine that the object is a cautious vehicle and apply a cautious object model to the corresponding simulated object in the simulated environment. In some instances, the scenario component 846 can determine, based on behavior data in the log data, that an object as an aggressive object, a passive object, a neutral object, and/or other types of behaviors and apply behavior instructions associated with the behavior (e.g., a passive behavior, a cautious behavior, a neutral behavior, and/or an aggressive behavior) to the simulated object.

In some instances, the scenario component 846 can use filters to remove objects represented in the log data from a simulated scenario based on attributes associated with the objects. In some instances, the scenario component 846 can filter objects based on an object/classification type (car, pedestrian, motorcycle, bicyclist, etc.), an object size (e.g., length, width, height, and/or volume), a confidence level, track length, an amount of interaction between the object and a vehicle generating the log data, and/or a time period.

By way of example and without limitation, the log data can include objects of varying sizes such as mailboxes and buildings. The scenario component 846 can use a volume-based filter such that objects that are associated with a volume greater equal to or greater than a threshold volume of three cubic meters, such as buildings, are represented in the simulated scenario and objects that are associated with a volume less than three cubic meters are not represented in the simulated scenario, such as the mailboxes. In some instances, the scenario component 846 can use a track length filter where objects that have track lengths (e.g., data associated with a physical distance or a period of time) that do not meet or exceed a track length threshold are filtered from the simulated scenario. This can result in a simulated scenario that omits objects associated with poor detections during the time of data capture. In some instances, the scenario component 846 can use a motion-based filter such that objects associated with motion or a trajectory according to the log data are represented in the simulated scenario. In some instances, the filters can be applied in combination or mutually exclusively.

In some instances, the scenario component 846 can filter objects that do not meet or exceed a confidence threshold. By way of example and without limitation, the log data can indicate that an object is associated with a classification attribute of a pedestrian and a confidence value of associated with the classification of 5%. The scenario component 846 can have a confidence value threshold of 75% and filter the object based on the confidence value not meeting or exceeding the confidence value threshold. In some instances, a user can provide a user-generated filter that includes one or more attribute thresholds such that the scenario component 846 can filter objects that do not meet or exceed the one or more attribute thresholds indicated by the user-generated filter.

The simulation component 848 can execute the simulated scenario as a set of simulation instructions and generate simulation data. For example, the simulation component 848 can execute simulated scenarios of the adverse events captured by the electronic devices 106 of the fleet of vehicles 108. In some instances, the simulation component 848 can execute multiple simulated scenarios simultaneously and/or in parallel. This can allow a user to edit a simulated scenario and execute permutations of the simulated scenario with variations between each simulated scenario.

Additionally, the simulation component 848 can determine an outcome for the simulated scenario. For example, the simulation component 848 can execute the scenario for use in a simulation for testing and validation. The simulation component 848 generate the simulation data indicating how the autonomous controller performed (e.g., responded) and can compare the simulation data to a predetermined outcome and/or determine if any predetermined rules/assertions were broken/triggered.

In some instances, the predetermined rules/assertions can be based on the simulated scenario (e.g., traffic rules regarding crosswalks can be enabled based on a crosswalk scenario or traffic rules regarding crossing a lane marker can be disabled for a stalled vehicle scenario). In some instances, the simulation component 848 can enable and disable rules/ assertions dynamically as the simulation progresses. For example, as a simulated object approaches an area of a heat map that indicate a higher likelihood of an adverse event occurring, rules/assertions related to heat map categorization can be enabled and disabled. In some instances, the rules/ assertions can include comfort metrics that relate to, for example, how quickly an object can accelerate given the simulated scenario.

Based at least in part on determining that the autonomous controller performed consistent with the predetermined outcome (that is, the autonomous controller did everything it was supposed to do) and/or determining that a rule was not broken or an assertion was not triggered, the simulation component 848 can determine that the autonomous controller succeeded. Based at least in part on determining that the autonomous controller performance was inconsistent with the predetermined outcome (that is, the autonomous controller did something that it wasn't supposed to do) and/or determining that a rule was broken or than an assertion was triggered, the simulation component 848 can determine that the autonomous controller failed. Accordingly, based at least in part on executing the simulated scenario, simulation data can indicate how the autonomous controller responds to each simulated scenario, as described above and determine a successful outcome or an unsuccessful outcome based at least in part on the simulation data. In some instances, the autonomous controller can be modified to maximize its success in the simulation component 848. For example, the autonomous controller can be modified to maximize the number of adverse event scenarios where the autonomous vehicle avoids a collision.

The processor(s) 818 of the computing device(s) 804 and the processor(s) 834 of the computing device(s) 832 can be any suitable processor capable of executing instructions to process data and perform operations as described herein. By way of example and not limitation, the processor(s) 818 and 834 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 820 computing device(s) 804 and the memory 836 of the computing device(s) 832 are examples of non-transitory computer-readable media. The memory 820 and 836 can store an operating system and one or more software applications, instructions, programs, and/or data to implement the methods described herein and the functions attributed to the various systems. In various implementations, the memory 820 and 836 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 820 and 836 can be implemented as a neural network.

Figure 9:
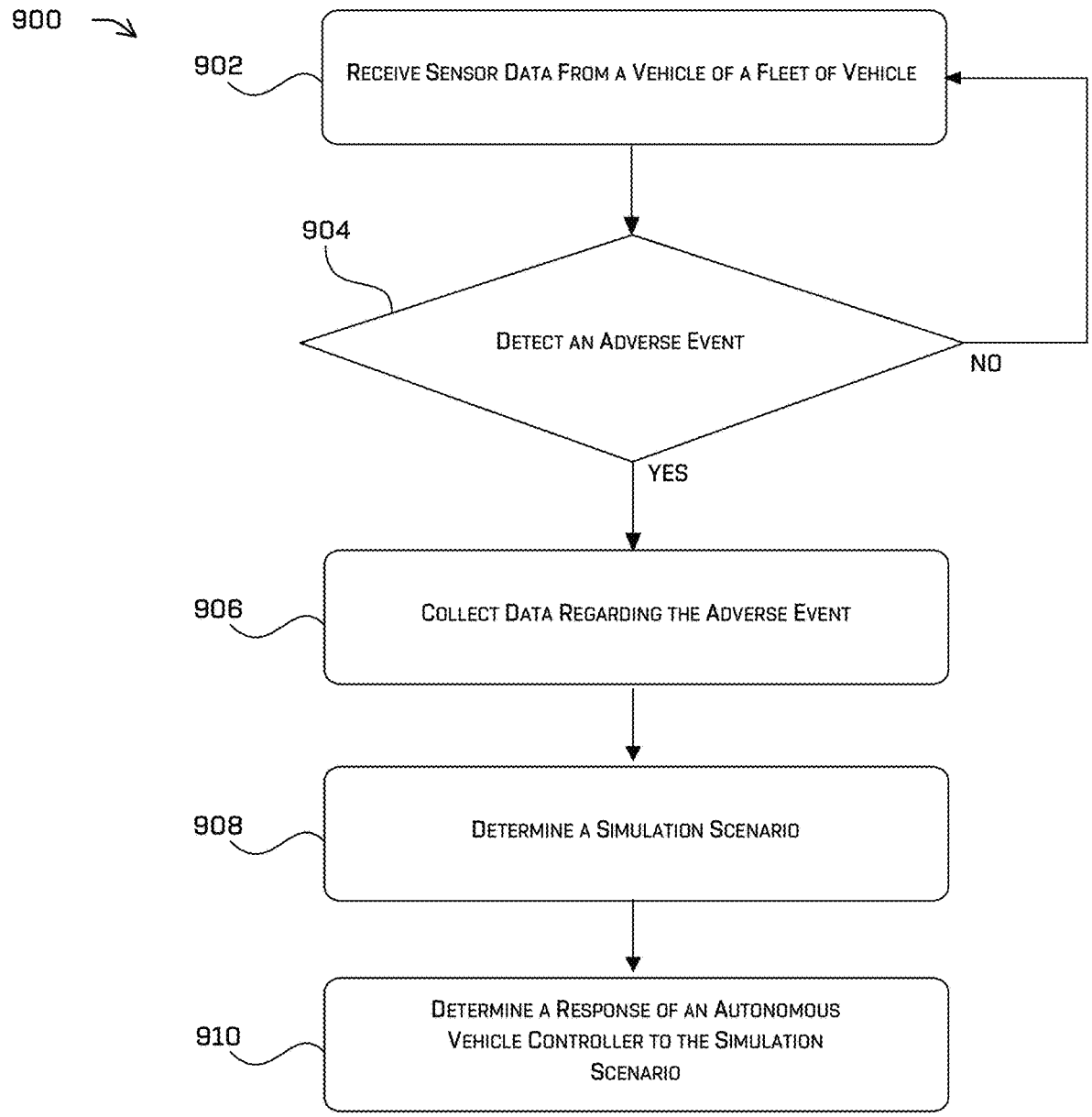
FIG. 9 is a flow diagram depicting a method of using data collected by a fleet of vehicles to operate an autonomous vehicle.

FIG. 9 is a flow diagram of an illustrative process 900 for using data collected from a fleet of vehicles to create simulation scenarios for controlling an autonomous vehicle. In various examples, the process 900 may be performed by a computing device, such as the computing device of an electronic device 106 collecting sensor data or a computing device 102.

At 902, the electronic device 106 receives data from one or more sensors. The one or more sensors may include camera, LIDAR sensors, RADAR sensors, GPS devices, gyroscopes, accelerometers, magnetometers, microphones, and/or other types of sensors for vehicle travel data collection. The electronic device 106 can be a dashcam mounted in the vehicle 108 or can be sensors pre-installed on the vehicle itself.

At 904, the data is analyzed to determine if an adverse event has occurred. The analysis can be performed by the computing device of the electronic device 106 or by the computing device 102. In some examples, the data is analyzed by the electronic device 106 and only data related to an adverse event is uploaded to the computing device 102. In other examples, all data is uploaded to the computing device where it is analyzed to detect adverse events. If an adverse event is detected, the process proceeds to 906. If no adverse event is detected, the process returns to 902.

At 906, the data regarding the adverse event is collected on the computing device. In some examples, the data regarding the adverse event is collected and segregated in the computing device of the electronic device 106. In other examples, the data regarding the adverse event is collected and segregated in the computing device of the computing device 102.

At 908, the computing device 102 can generate simulation instructions that, when executed by a simulator, can generate simulation data that represents the adverse event detected in operation 904. The simulation instructions can describe, for example, the placement of objects in a simulated environment, a trajectory for one or more objects, and trigger regions associated with instantiation of objections, etc.

At 910, the computing device 102 can generate simulation data that can indicate how an autonomous vehicle controller responds to the simulated scenario. In some instances, the simulation can determine an outcome for the autonomous vehicle based on the simulation data. For example, the simulation can execute the scenario for use in a testing and validation of the autonomous controller. The simulation can generate data indicating how the autonomous controller performed (e.g., responded) and can compare the simulation data to a predetermined outcome and/or determine if any predetermined rules/assertions were broken/triggered.

Figure 10:
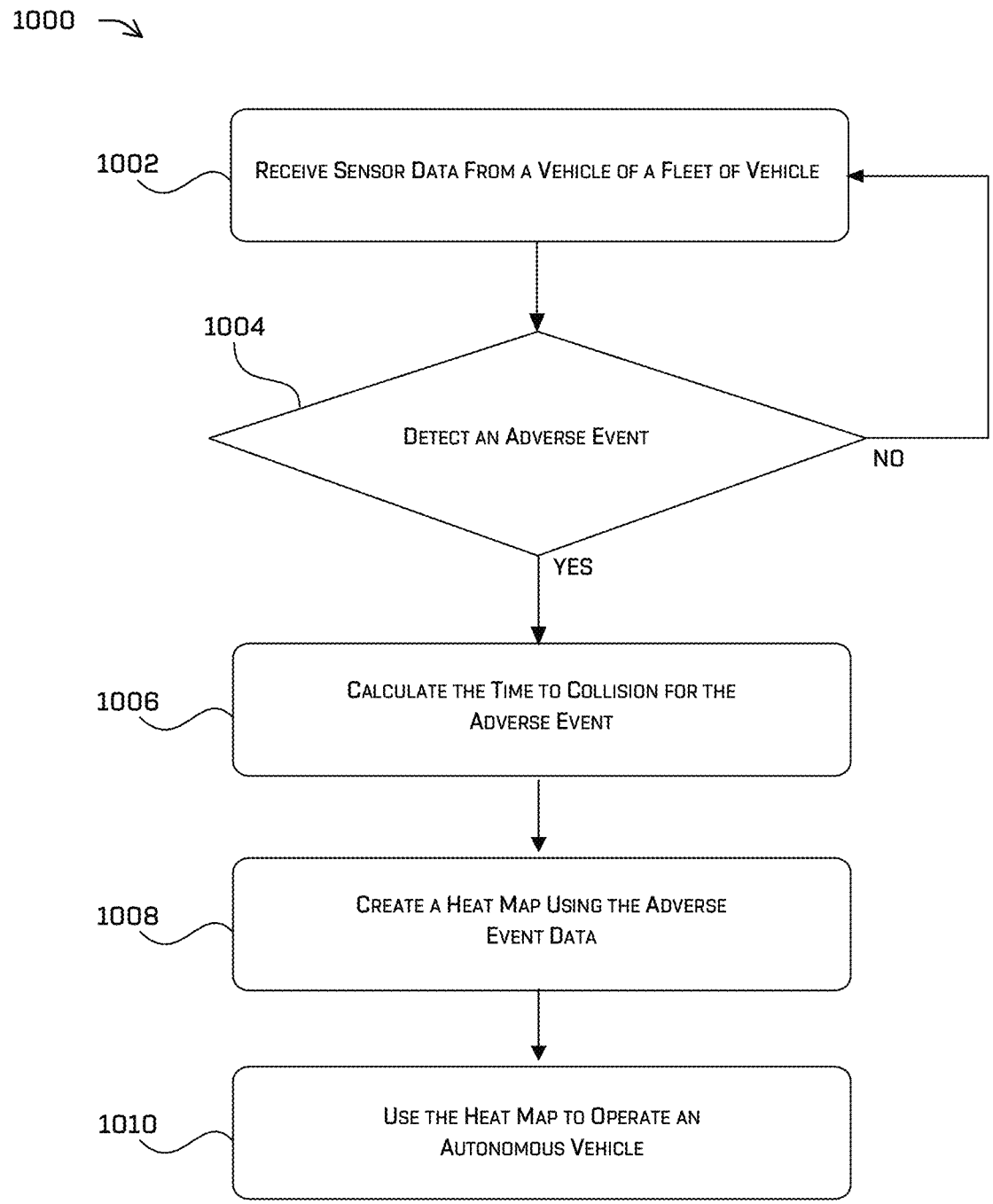
FIG. 10 is a flow diagram depicting a method of using data collected by a vehicle of a vehicles to create a heat map to be used in operating an autonomous vehicle.

FIG. 10 is a flow diagram of an illustrative process 1000 for using data collected from a fleet of vehicles to create a heat map for use in controlling an autonomous vehicle. In various examples, the process 1000 may be performed by a computing device, such as the computing device of an electronic device 106 collecting sensor data or a computing device 102.

At 1002, the electronic device 106 receives data from one or more sensors. The one or more sensors may include camera, LIDAR sensors, RADAR sensors, GPS devices, gyroscopes, accelerometers, magnetometers, microphones, and/or other types of sensors for vehicle travel data collection. The electronic device 106 can be a dashcam mounted in the vehicle 108 or can be sensors pre-installed on the vehicle itself.

At 1004, the data is analyzed to determine if an adverse event has occurred. The analysis can be performed by the computing device of the electronic device 106 or by the computing device 102. In some examples, the data is analyzed by the electronic device 106 and only data related to an adverse event is uploaded to the computing device 102. In other examples, all data is uploaded to the computing device where it is analyzed to detect adverse events. If an adverse event is detected, the process proceeds to 1006. If no adverse event is detected, the process returns to 1002.

At 1006, the sensor data surrounding the adverse event is used to calculate a TTC metric. The TTC metric can be calculated using the method described above or any other known method of calculating TTC.

At 1008, the adverse event is logged onto the global map data in order to create a heat map. In some examples, the heat map is based on the frequency of adverse events in an area. In other examples, the heat map can be based on another metric such as the average TTC for an adverse event in an area. In other examples, the heat map can represent an algorithm combining different metrics such as collision frequency and TTC. Each area on the heat map can be assigned a value or level based on the frequency and/or severity of adverse events in that area.

At 1010, an autonomous vehicle is controlled at least in part using the value of the area of the heat map in which it is traversing. In some examples, an autonomous vehicle may plan its route to avoid areas of a certain threshold value on the heat map or may prioritize traveling through areas of lower value on the heat map. In other examples, the operation of sensors on an autonomous vehicle may be changed depending on the value of the area of the heat map in which it is traversing. For example, the sensors of the autonomous vehicle may increase their range or take readings at a higher frequency when in areas of higher value on the heat map. The autonomous vehicle may change other settings in order to increase its reaction time in areas of higher value on the heat map.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the claims.

EXAMPLE CLAUSES

The following paragraphs describe various examples. Any of the examples in this section may be used with any other of the examples in this section and/or any of the other examples or embodiments described herein.

A: In some examples, a system comprising one or more processors and one or more non-transitory computer-readable media storing instructions executable by the one or more processors, wherein the instructions, when executed, may cause the system to perform operations comprising: receiving, from a first dashcam of a first vehicle, first data associated with a first adverse event, wherein the first dashcam includes a sensor configured to capture the adverse event and memory configured to store the first data associated with the first adverse event; determining, based at least in part on the first data, a first location corresponding to the first adverse event; receiving, from a second dashcam of a second vehicle, second data associated with a second adverse event, wherein the second dashcam includes a sensor configured to capture the second data associated with the second adverse event and memory configured to store the second data associated with the second adverse event;

determining, based at least in part on the second data, a second location corresponding to the second adverse event; associating the first location and the second location with a map wherein the map includes location data corresponding to adverse events; and controlling an autonomous vehicle based at least in part on the map.

B: The system of example A, wherein the instructions, when executed, cause the system to perform further operations comprising: performing a statistical analysis to determine a probability of an occurrence of an adverse event associated with the first location or the second location.

C: The system of example A or B, wherein the first dashcam comprises an accelerometer, and wherein the instructions, when executed, cause the system to perform operations comprising: using data from the accelerometer to determine a time-to-collision metric associated with the adverse event and the controlling the autonomous vehicle is based at least in part on the time-to-collision metric.

D: The system of any one of examples A-C, wherein the first dashcam includes an attachment mechanism configured to removably mount the first dashcam to the first vehicle such that the first dashcam can be repeatedly attached and removed from a vehicle.

E: The system of any one of examples A-D, wherein the first dashcam does not include a radar or lidar sensor.

F: The system of any one of examples A-E, wherein the first vehicle is not an autonomous vehicle.

G: In some examples, a method may comprise: receiving, from a dashcam of a vehicle, data associated with an adverse event, wherein the dashcam includes a sensor configured to capture the adverse event and memory configured to store the data associated with the adverse event; determining, based at least in part on the data, a location corresponding to the adverse event associated with the data; associating the location with a map wherein the map includes location data corresponding to adverse events; and controlling an autonomous vehicle based at least in part on the map.

H: The method of example G, wherein dashcam includes a sensor configured to detect a location corresponding to the adverse event and the data associated with the adverse event includes the location.

I: The method of example G or H, wherein operations further comprise determining an adverse event heat map based at least in part on the map and the data.

J: The method of any one of examples G-I, wherein determining the location corresponding to the adverse event includes associating an object represented in the data with an object represented in the map.

K: The method of any one of examples G-J, wherein the dashcam includes an accelerometer configured to detect forces indicative of an adverse condition and store the data in the memory in response to detecting forces indicative of an adverse condition.

L: The method of any one of examples G-K, wherein controlling an autonomous vehicle based at least in part on the map includes selecting a trajectory for the autonomous vehicle based at least in part on a location represented in the map and corresponding adverse event data.

M: The method of example L, wherein the trajectory is selected to favor a location corresponding to a relatively low probability of an adverse event and avoid a location corresponding to a relatively high probability of an adverse event.

N: In some examples, one or more non-transitory computer-readable media storing processor-executable instructions that, when executed by one or more processors may cause the one or more processors to perform operations comprising: receiving, from a dashcam of a vehicle, data associated with an adverse event, wherein the dashcam includes a sensor configured to capture the adverse event and memory configured to store the data associated with the adverse event; determining, based at least in part on the data, a location corresponding to the adverse event associated with the data; associating the location with a map wherein the map includes location data corresponding to adverse events; and controlling an autonomous vehicle based at least in part on the map.

O: The one or more non-transitory computer-readable media of example N, wherein dashcam includes a sensor configured to detect a location corresponding to the adverse event and the data associated with the adverse event includes the location.

P: The one or more non-transitory computer-readable media of examples N or wherein operations further comprise determining an adverse event heat map based at least in part on the map and the data.

Q: The one or more non-transitory computer-readable media of any one of examples N-P, wherein determining the location corresponding to the adverse event includes associating an object represented in the data with an object represented in the map.

R: The one or more non-transitory computer-readable media of any one of examples N-Q, wherein the dashcam includes an accelerometer configured to detect forces indicative of an adverse condition and store the data in the memory in response to detecting forces indicative of an adverse condition.

S: The one or more non-transitory computer-readable media of any one of examples N-R, wherein controlling an autonomous vehicle based at least in part on the map includes selecting a trajectory for the autonomous vehicle based at least in part on a location represented in the map and corresponding adverse event data.

T: The one or more non-transitory computer-readable media of example S, wherein the trajectory is selected to favor a location corresponding to a relatively low probability of an adverse event and avoid a location corresponding to a relatively high probability of an adverse event.

U: In some examples, a method may comprise: receiving, at one or more processors, first sensor data from a first dashcam of a first vehicle, where the first dashcam comprises a first sensor configured to capture first video data and first memory configured to store the first video data; receiving, at the one or more processors, second sensor data from a second dashcam of a second vehicle, where the second dashcam comprises a second sensor configured to capture second video data and second memory configured to store the second video data; identifying, within the first video data, an object associated with an adverse event; identifying, within the second video data, the object associated with the adverse event; aligning, in time, the object in the first video data with the second video data; generating, based at least in part on data associated with the object from the first video data and data corresponding to the object from the second video data, a simulation including the object; and determining a simulation comprising an autonomous vehicle and the object.

V: The method of example U, wherein the aligning the object in the first video data with the second video data includes performing a visual analysis between the first video data and the second video data identifying a first state of the object in the first video data corresponding to a second state of the object in the second video data at a corresponding time.

W: The method of example V, wherein the aligning the object in the first video data with the second video data includes identifying the object having a first view within the first video data and the object having a second view, different from the first view, within the second video data.

X: The method of any one of examples U-W, wherein the determining the simulation includes generating a representation for the object corresponding to movement of the object within the first video data and the second video data.

Y: The method of any one of examples U-X, further comprising: identifying a location of the object corresponding to a map, wherein determining the simulation is based at least in part on the map.

Z: In some examples, a method may comprise: receiving, at one or more processors, image data from a dashcam of a vehicle, wherein the dashcam comprises: a sensor configured to capture the image data associated with an adverse event; memory configured to store the image data associated with the adverse event; and an attachment mechanism configured to removably mount the dashcam to the vehicle; identifying, within the image data, objects associated with the adverse event; determining, based at least in part on the image data, relative locations of the objects; generating, based at least in part on the relative locations of the objects, a simulation including the objects; and determining a response of an autonomous vehicle controller to the simulation.

AA: The method of example Z, wherein the dashcam further comprises another sensor configured to detect a location of the dashcam and wherein the simulation is generated based at least in part on the location of the dashcam associated with the adverse event.

AB: The method of example Z or AA, wherein the dashcam includes another sensor configured to detect indicia of the adverse event and wherein the dashcam is configured to record image data in response to the sensor configured to detect indicia of the adverse event detecting the indicia.

AC: The method of any one of examples Z-AB, further comprising: receiving data associated with the adverse event from an electronic device other than the dashcam; and generating the simulation further based at least in part on the data received from the electronic device other than the dashcam.

AD: The method of example AC, wherein the electronic device other than the dashcam is configured to determine the data associated with the adverse event based, at least in part, on a signal received from the dashcam of the vehicle.

AE: The method of any one of examples Z-AD, wherein detecting the adverse event includes: determining, based at least in part on the image data, a location associated with an object represented in the image data; identifying the object; and identifying a first location of the object at a first time and a second location of the object at a second time within map data, wherein generating the simulation is based at least in part on the first location and the second location.

AF: The method of any one of examples Z-AE, further comprising receiving image data from a second dashcam coupled to a second vehicle, wherein the simulation is additionally generated based at least in part on the image data from the second dashcam.

AG: The method of example AF, wherein the relative locations of the objects are determined further based at least in part on the image data from the second dashcam.

AH: In some examples, one or more non-transitory computer-readable media storing processor-executable instructions that, when executed by one or more processors, may cause the one or more processors to perform operations comprising: receiving image data from a dashcam of a vehicle, wherein the dashcam comprises: a sensor configured to capture the image data associated with an adverse event; memory configured to store the image data associated with the adverse event; and an attachment mechanism configured to removably mount the dashcam to the vehicle; identifying, within the image data, objects associated with the adverse event; determining, based at least in part on the image data, relative locations of the objects; generating, based at least in part on the relative locations of the objects, a simulation including the objects; and determining a response of an autonomous vehicle controller to the simulation.

AI: The one or more non-transitory computer-readable media of example AH, wherein the dashcam further comprises another sensor configured to detect a location of the dashcam and wherein the simulation is generated based at least in part on the location of the dashcam associated with the adverse event.

AJ: The one or more non-transitory computer-readable media of example AH or AI, wherein the dashcam includes another sensor configured to detect indicia of the adverse event and wherein the dashcam is configured to record image data in response to the sensor configured to detect indicia of the adverse event detecting the indicia.

AK: The one or more non-transitory computer-readable media of any one of examples AH-AJ, the operations further comprising: receiving data associated with the adverse event from an electronic device other than the dashcam; and generating the simulation further based at least in part on the data received from the electronic device other than the dashcam.

AL: The one or more non-transitory computer-readable media of example AK, wherein the electronic device other than the dashcam is configured to receive the data associated with the adverse event based, at least in part, on a signal received from the dashcam of the vehicle.

AM: The one or more non-transitory computer-readable media of any one of examples AH-AL, wherein detecting the adverse event includes: determining, based at least in part on the image data, a location associated with an object represented in the image data; identifying the object; and identifying a first location of the object at a first time and a second location of the object at a second time within map data, wherein generating the simulation is based at least in part on the first location and the second location.

AN: The one or more non-transitory computer-readable media of any one of examples AH-AM, the operations further comprising receiving image data from a second dashcam coupled to a second vehicle, wherein the simulation is additionally generated based at least in part on the image data from the second dashcam.

While the example clauses described above are described with respect to one particular implementations, it should be understood that, in the context of this document, the content of the example clauses may also be implemented via a method, device, system, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that some examples can be used and that changes or alterations, such as structural changes, can be made. Such examples, changes or alterations are not necessarily departures from the scope with respect to the intended claimed subject matter. While features, components, and operations may be presented in a certain arrangement, configuration, and/or order, the arrangement, configuration, and/or order may be rearranged, combined, or omitted without changing the function of the systems and methods described.

What is claimed is:

1. A system comprising one or more processors and one or more non-transitory computer-readable media storing instructions executable by the one or more processors, wherein the instructions, when executed, cause the system to perform operations comprising:
   receiving, from a first dashcam of a first vehicle, first data associated with a first adverse event, wherein the first dashcam includes a first sensor configured to capture the first adverse event and a first memory configured to store the first data associated with the first adverse event;
   determining, based at least in part on the first data, a first location corresponding to the first adverse event;
   receiving, from a second dashcam of a second vehicle, second data associated with a second adverse event different from the first adverse event, wherein the second dashcam includes a second sensor configured to capture the second data associated with the second adverse event and a second memory configured to store the second data associated with the second adverse event;
   determining, based at least in part on the second data, a second location corresponding to the second adverse event;
   associating the first location and the second location with a map wherein the map includes a plurality of locations corresponding to a plurality of adverse events, wherein the plurality of adverse events comprise at least the first adverse event and the second adverse event; and
   controlling an autonomous vehicle based at least in part on the map.

2. The system of claim 1, wherein the instructions, when executed, cause the system to perform further operations comprising:
   performing a statistical analysis to determine a probability of an occurrence of the plurality of adverse events associated with the first location or the second location.

3. The system of claim 1, wherein the first dashcam comprises an accelerometer, and wherein the instructions, when executed, cause the system to perform operations comprising:
   using data from the accelerometer to determine a time-to-collision metric associated with the first adverse event and the controlling the autonomous vehicle is based at least in part on the time-to-collision metric.

4. The system of claim 1, wherein the first dashcam includes an attachment mechanism configured to removably mount the first dashcam to the first vehicle such that the first dashcam can be repeatedly attached and removed from a vehicle.

5. The system of claim 1, wherein the first dashcam does not include a radar or lidar sensor.

6. A method comprising:
   receiving, from a dashcam of a vehicle, data associated with an adverse event, wherein the dashcam includes a sensor configured to capture the adverse event and a memory configured to store the data associated with the adverse event;
   determining, based at least in part on the data, a location corresponding to the adverse event associated with the data;
   associating the location with a map wherein the map includes a plurality of locations corresponding to a plurality of adverse events, wherein the adverse events comprise at least at the adverse event and a logged adverse event different from the adverse event; and
   controlling an autonomous vehicle based at least in part on the map.

7. The method of claim 6, wherein the dashcam includes the sensor configured to detect the location corresponding to the adverse event and wherein the data associated with the adverse event includes the location.

8. The method of claim 6, further comprising determining an adverse event heat map based at least in part on the map and the data.

9. The method of claim 6, wherein determining the location corresponding to the adverse event includes associating a data object represented in the data with a map object represented in the map.

10. The method of claim 6, wherein the dashcam includes an accelerometer configured to detect forces indicative of an adverse condition and store the data in the memory in response to detecting the forces indicative of the adverse condition.

11. The method of claim 6, wherein controlling an autonomous vehicle based at least in part on the map includes selecting a trajectory for the autonomous vehicle based at least in part on the plurality of locations represented in the map and corresponding adverse event data.

12. The method of claim 11, wherein the trajectory is selected to favor a first location corresponding to a relatively low probability of the adverse event and avoid a second location corresponding to a relatively high probability of the adverse event.

13. The method of claim 6, wherein the map includes an assigned value associated with the location, wherein the assigned value associated with the location is determined based at least in part on an occurrence of the plurality of adverse events associated with the location.

14. One or more non-transitory computer-readable media storing processor-executable instructions that, when executed by one or more processors cause the one or more processors to perform operations comprising:
   receiving, from a dashcam of a vehicle, data associated with an adverse event, wherein the dashcam includes a sensor configured to capture the adverse event and memory configured to store the data associated with the adverse event;
   determining, based at least in part on the data, a location corresponding to the adverse event associated with the data;
   associating the location with a map, wherein the map includes a plurality of locations corresponding to a plurality of adverse events, wherein the plurality of adverse events comprise at least the adverse event and a logged adverse event different from the adverse event; and
   controlling an autonomous vehicle based at least in part on the map.

15. The one or more non-transitory computer-readable media of claim 14, wherein the sensor is configured to detect the location corresponding to the adverse event and wherein the data associated with the adverse event includes the location.

16. The one or more non-transitory computer-readable media of claim 14, wherein operations further comprise determining an adverse event heat map based at least in part on the map and the data.

17. The one or more non-transitory computer-readable media of claim 14, wherein determining the location corresponding to the adverse event includes associating a data object represented in the data with a map object represented in the map.

18. The one or more non-transitory computer-readable media of claim 14, wherein the dashcam includes an accelerometer configured to detect forces indicative of an adverse condition and store the data in the memory in response to detecting the forces indicative of the adverse condition.

19. The one or more non-transitory computer-readable media of claim 14, wherein controlling an autonomous vehicle based at least in part on the map includes selecting a trajectory for the autonomous vehicle based at least in part on the plurality of locations represented in the map and corresponding adverse event data.

20. The one or more non-transitory computer-readable media of claim 19, wherein the trajectory is selected to favor a first location corresponding to a relatively low probability of the adverse event and avoid second location corresponding to a relatively high probability of the adverse event.

* * * * *